US009394460B1

(12) United States Patent
Yang et al.

(10) Patent No.: US 9,394,460 B1
(45) Date of Patent: Jul. 19, 2016

(54) AMBIENT SELF-CROSSLINKABLE LATEX

(71) Applicant: Columbia Insurance Company, Omaha, NE (US)

(72) Inventors: Shi-Jun Yang, Maple Glen, PA (US); Gary Dandreaux, River Edge, NJ (US); Robert J. Sheerin, North Caldwell, NJ (US); Caleb Jardel, Cresco, PA (US)

(73) Assignee: Columbia Insrancc Company, Omaha, NE (US)

( * ) Notice: Subject to any disclaimer, the term of this patent is extended or adjusted under 35 U.S.C. 154(b) by 0 days.

(21) Appl. No.: 14/793,013

(22) Filed: Jul. 7, 2015

Related U.S. Application Data

(63) Continuation-in-part of application No. 14/281,150, filed on May 19, 2014, now Pat. No. 9,115,265, which is a continuation-in-part of application No. 14/343,292, filed as application No. PCT/US2012/055883 on Sep. 18, 2012.

(60) Provisional application No. 61/536,264, filed on Sep. 19, 2011.

(51) Int. Cl.
*C08K 5/20* (2006.01)
*C09D 133/26* (2006.01)
*C08K 5/25* (2006.01)

(52) U.S. Cl.
CPC .............. *C09D 133/26* (2013.01); *C08K 5/25* (2013.01)

(58) Field of Classification Search
CPC ........................................................ C08K 5/20
USPC .......................... 524/457, 555, 592, 607, 608
See application file for complete search history.

(56) References Cited

U.S. PATENT DOCUMENTS

| | | | |
|---|---|---|---|
| 3,451,480 | A | 6/1969 | Zeh, Jr. et al. |
| 3,497,467 | A | 2/1970 | Coleman |
| 3,838,104 | A | 9/1974 | Hayashi et al. |
| 3,884,792 | A | 5/1975 | McGilvery |
| 5,912,293 | A | 6/1999 | Stockwell et al. |
| 6,656,998 | B1 | 12/2003 | Robeson et al. |
| 7,285,590 | B2 | 10/2007 | Holub et al. |
| 7,648,034 | B2 | 1/2010 | Charkoudian et al. |
| 2003/0158324 | A1 | 8/2003 | Maxim, Jr. |
| 2007/0135567 | A1 | 6/2007 | Ruhoff et al. |
| 2012/0142847 | A1 | 6/2012 | Yang et al. |

FOREIGN PATENT DOCUMENTS

| | | |
|---|---|---|
| CN | 101348541 A | 1/2009 |
| CN | 101817906 A | 9/2010 |
| EP | 0989163 A1 | 3/2000 |
| WO | 2013043579 A1 | 3/2013 |

OTHER PUBLICATIONS

A page from the Partial Supplementary European Search Report issued in connection with European Patent Application No. 12832804.4 on Apr. 23, 2015.
Machine translation of CN 101817906 A.
Translated Abstract of CN 101348541.
W.R. Grace & Co. "Coatings Product Overview." www.grace.com/engineeredmaterials/productsandapplications/coating.
Eastman Chemical Company. "Utility of Eastman AAEM (acetoacetoxyethyl methacrylate) in Thermoset Coatings." 2012. www.eastman.com.
Examples of IR Crosslinking.
Ropaque OP-96 Opaque Polymer. "Polymer Health Effects Primary Routes of Entry." The Dow Chemical Company. May 28, 2009.
"Sylysia—Micronized Particles with High Porosity." Fuji Silysia Chemical Ltd. 2003. www./fuji-silysia.co.jp/english/product/micronized_silicas/sylysia.html.
Material Safety Data Sheet—Triton(TM) GR-5M Surfactant. The Dow Chemical Company.
Material Safety Data Sheet—TAMOL(TM) 2002 Dispersant. The Dow Chemical Company. 2012.
Rhodia RHODAFAC(R) RS-610/A25 Surfactant. Matweb Material Property Data. Rhodia Engineering Plastics.
Safety Data Sheet—FoamStar(R) ST 2445 (old Foamstar(R) A-45) BASF—A Chemical Company.
Technical Data Sheet. Momentive. 2012.
Evonik CYRO ROHAMERE(R) 6844-O N-(2-Methacryloyloxyethyl)Ethylene Urea 25% Solution in Methylmethacrylate. Matweb.
Product Data Sheet—Eastman Optifilm(TM) Enhancer 400. www.eastman.com.
MINEX(R)—Functional Fillers & Extenders. Unimin Corporation. 2013.
Wet Adhesion Monomer Visiomer(R) MEEU. Evonik Industries.
Rhodia RHODAFAC(R) RS-610/A25 Surfactant. Rhodia Engineering Plastics. 2013.
Aquaflow(R) NHS-350. SpecialChem4Coatings. Ashland Inc. 2013.
Product Safety Assessment: ROPAQUE Opaque Polymer Products. The DOW Chemical Company. Jun. 2012.

*Primary Examiner* — Vu A Nguyen
(74) *Attorney, Agent, or Firm* — The H.T. Than Law Group

(57) ABSTRACT

The present invention relates to storage stable film forming latex particles that crosslink under ambient conditions during or after drying. Monomers for the formation of the crosslinkable moieties in the latex particles include diacetone acrylamide (DAAM) or the likes and methacrylamide (MAM) or the likes with or without styrene. A paint composition comprising the storage stable latex particles that may include a small amount or crosslinking agent such as adipic acid dihydrazide (ADH) in the aqueous phase is also described.

20 Claims, No Drawings

AMBIENT SELF-CROSSLINKABLE LATEX

CROSS REFERENCE TO RELATED APPLICATION

This application is a continuation-in-part of U.S. Nonprovisional Application No. 14/281,150, submitted on May 19, 2014 entitled "Ambient Self-Crosslinkable Latex", which is a continuation-in-part of U.S. Non-provisional Patent Application No. 14/343,292 submitted on Mar. 6, 2014, entitled "Hydroxyethyl Cellulose Grafted Acrylic Latex" which claims priority to International Patent Application No. PCT/US2012/055883, filed Sep. 18, 2012, entitled "Hydroxyethyl Cellulose Grafted Acrylic Latex" which claims priority to the U.S. Provisional Application No. 61/536,264, filed Sep. 19, 2011, entitled "Hydroxyethyl Cellulose Grafted Acrylic Latex." The contents of all parent applications are incorporated herein by reference in their entireties.

FIELD OF THE INVENTION

This invention generally relates to aqueous latex compositions comprising self-crosslinkable polymer emulsions and methods for preparing same, as well as products formed with said composition. Specifically, the invention involves a novel crosslinking mechanism involving diacetone acrylamide and methacrylamide and a smaller optional amount of adipic dihydrazide (ADH) to improve the mechanical properties of the paint film formed from said composition.

BACKGROUND OF THE INVENTION

There is increasing societal sensitivity to environmental issues, including restrained use of organic solvents, volatile organic compounds (VOCs) and other additives such as coalescent agents due to health concerns. One area in which the foregoing has become important is architectural coatings, especially aqueous latex paints and water borne coating compositions. As a result, aqueous latex paints and water borne coating compositions are gaining popularity.

In practice, however, it is a challenge to minimize the use of organic solvents, VOCs and additives without diminution of the performance of the coatings. Coalescence is a process whereby polymer particles in an aqueous latex or dispersion come into contact with one another during film-forming process and polymer chains diffuse across boundaries of latex/dispersion particles to yield continuous films with good bonding of the polymer particles. There is a balance between achieving the desired hardness of a resulting dried film from an aqueous paint composition and having the proper coalescence.

A method of improving the properties of films formed by water-borne compositions is to include polymer latex particles that are capable of being crosslinked. In one example, diacetone acrylamide (DAAM) is included in the latex particles as moieties. Crosslinking agents within the aqueous composition but not part of the latex particles can be used to crosslink the polymer latex particles when the aqueous composition is applied to a substrate under ambient conditions. Adipic dihydrazide (ADH) is one of these crosslinking agents that have been used for aqueous latex polymers. However, the conventional approach of using diacetone acrylamide (DAAM) as part of the latex and adipic dihydrazide (ADH) as free floating agents in the aqueous composition sometimes allows crosslinking reactions between the DAAM and ADH to take place during storage, i.e., while the latex particles are in the aqueous phase. This may diminish shelf stability and reduce intra particle crosslinking under ambient drying conditions. Other conventional two-component crosslinking approaches have similar stability issues as well as VOC and odor concerns.

U.S. Pat. No. 3,838,104 to Hayashi et al. discloses an oil and water-repellent copolymer by copolymerizing diacetone acrylamide (DAAM), diacetonemethacrylamide (DAMAM) or a lower alkylol derivative thereof and a fluoroalkyl monomer. Hayashi does not disclose an aqueous latex composition that may crosslink when applied to a substrate under ambient conditions. CN 101348541 to Li discloses a crosslinking acrylate composite emulsion. The functional monomers include diacetone acrylamide (DAAM) and adipic dihydrazide (ADH). U.S. Pat. No. 3,451,480 to Zeh discloses a copolymer of arcylamide and diacetone acrylamide (DAAM) as a friction reducer in brines used in oil well fracturing. Up to 0.006% of N,N'-methylene bisacrylamide may be included as a cross-linking agent. WO 03/068880 A1 describes a latent cross-linking thickener composition including diacetone acrylamide (DAAM) and adipic dihydrazide (ADH).

Lu et al. (Zhongguo Jiaonianji, 15 (1), 2006, pp. 17-20) describes a blend of self-crosslinking acrylate latexes. Each of the latexes is copolymerized from diacetone acrylamide (DAAM), acrylamide (AM) or N-methylacrylamide, among other monomers. However, a blend of DAAM containing copolymer with an AM containing copolymer shows a lack of water resistance. U.S. Pat. No. 3,497,467 to Coleman discloses an aqueous polymer latexes having diacetone acrylamide (DAAM) monomer as the main component. The DAAM dominant polymer can be a copolymer with a vinyl or another acrylic monomer. WO 02/087734 A1 discloses hydrophobic membranes modified with a surface coating that includes a cross-linked ter-polymer. The monomers include diacetone acrylamide (DAAM), N,N'-methylenebisacrylamide and N,N-dimethylacrylamide.

All patents and publications discussed herein are incorporated by reference herein in their entirety.

There remains an unmet need for an aqueous latex composition that is stable during storage while still being capable of crosslinking when applied on a substrate with only a small amount of water borne crosslinking agents, such as ADH, during or after drying under ambient conditions. Crosslinking after film formation would improve film strength, block and water resistances and bring other benefits to the water borne coatings, while achieving proper film formation.

SUMMARY OF THE INVENTION

It is, therefore, an object of the present invention to provide a latex composition that remains substantially free of crosslinking reactions during storage, thus having improved shelf life, but that allows self-crosslinking to occur under ambient conditions after application to a substrate. In one embodiment, the object is achieved by an inventive aqueous composition comprising latex particles polymerized from principally acrylic and/or vinyl acrylic monomers with moieties of diacetone acrylamide (DAAM) monomers or the likes and methacrylamide (MAM) monomers or the likes, wherein the latex particles crosslink when the water content is reduced or substantially depleted under ambient conditions by drying or evaporation. The inventive self-crosslinkable latex particles can crosslink with an optional small amount of a crosslinking agent such as adipic dihydrazide that would reside in the water component. As stated in the parent application Ser. No. 14/281,150, the water borne crosslinking agent can be omitted or the aqueous composition containing the inventive self-crosslinkable latex particles can be substantially free of the water borne crosslinking agent.

It is another object of the present invention to provide an aqueous core/shell latex composition which crosslinks during or after the evaporation of water.

It is still yet another object of the present invention to provide an aqueous composition comprising latex particles having a $C_4$-$C_{18}$ ethylenically unsaturated monomer moiety containing a ketone and a $C_3$-$C_{18}$ ethylenically unsaturated monomer moiety containing a primary amide, wherein the ketone is substantially unreactive to the primary amide when the latex is in storage in an aqueous solution and wherein the ketone reacts with the primary amide and latex particles crosslink when water is at least partially removed from the latex under ambient conditions with a small amount of a water borne cross-linking agent. Preferably, the ratios of the combined the $C_4$-$C_{18}$ ethylenically unsaturated monomer moiety containing a ketone, such as DAAM, and the $C_3$-$C_{18}$ ethylenically unsaturated monomer moiety containing a primary amide, such as MAM, to the crosslinking agent in the aqueous phase such as ADH, as shown in Comparative Experiment E (below) is preferably from about 2.5:1 to about 7.0:1, more preferably from about 2.7:1 to about 6.5:1 and more preferably from about 2.8:1 to about 6.0:1.

One embodiment of the present invention is directed to an aqueous composition comprising latex particles, which comprise a film forming monomer, a $C_4$-$C_{18}$ ethylenically unsaturated monomer moiety containing a ketone and a $C_3$-$C_{18}$ ethylenically unsaturated monomer moiety containing a primary amide. The ketone is substantially unreactive to the primary amide when the latex particles are in storage in water and wherein the ketone reacts with the primary amide and latex particles crosslink when water is at least partially removed from the latex particles under ambient conditions. The monomer containing a ketone can be diacetone acrylamide, diacetone methacrylamide, or acetoacetoxyethyl methacrylate, or combinations thereof. The monomer containing a primary amide can be methacrylamide and/or acrylamide.

Another embodiment of the present invention is directed to an aqueous composition comprising film forming latex particles having crosslinking moieties. The crosslinking moieties comprise a diacetone acrylamide moiety and a methacrylamide moiety. The latex particles cross-link when applied to a substrate at ambient conditions. In one aspect of the present invention, the composition contains a small amount adipic acid dihydrazide or the like to improve the scrub resistance of the paint film (under ASTM-D2486 standard).

The film forming latex particles preferably comprise acrylic latex particles. Alternatively, the film forming latex particles may also comprise at least about 75% acrylic or vinyl monomers. The ratio by weight of diacetone acrylamide to methacrylamide ranges from about 20:1 to about 1:20 by weight, preferably from about 8:1 to about 1:5, preferably from about 6:1 to about 1:3, more preferably from about 4:1 to about 1:2.

A ratio by weight of diacetone acrylamide and methacrylamide to film forming monomers ranges from about 0.1:100 to 10:100, preferably from about 0.5:100 to 5:100, more preferably from about 1:100 to 3:100. The latex particles may have a molecular weight from about 20K to about 500K Daltons based on GPC measurement, preferably from about 80K to about 300K Daltons based on GPC measurement.

The latex particles should have a MFFT from about −10° C. to about 50° C., more preferably from about −5° C. to about 25° C.

The present invention is also directed to an aqueous composition comprising core shell latex particles having a shell polymer comprising diacetone acrylamide and methacrylamide moieties, wherein the latex particles crosslink when applied to a substrate at ambient conditions. Preferably, the core polymer has a diacrylate crosslinker.

DETAILED DESCRIPTION OF THE INVENTION

In a preferred embodiment of the invention, self-crosslinking latex polymers and resins can advantageously comprise at least a pair of crosslinkable functional groups or moieties that are reactive with one another under ambient conditions in the absence of water or reduced water content to form a covalent bond, but which are substantially not reactive with each other during storage in water, and the ambient self-crosslinking may occur without a crosslinking agent(s) that resides in the water. The present inventors have further discovered that these crosslinking agents such as ADH suspended in water at an amount lower than the stoichiometric amount to fully react with the cross-linkable moiety, such as DAAM, can improve the scrubbing resistance of the paint film. Other compounds may be needed in the composition to control the reactivity of the crosslinking agents, which may also have unpleasant odors.

Hence, the inventive aqueous composition comprises self-crosslinking latex polymers and/or resins that have at least a pair of crosslinkable functional groups or moieties that are reactive with one another under ambient conditions in the absence of water or reduced water content to form a covalent bond, and an amount of crosslinking agent residing in the water phase. The amount of crosslinking agent is preferably less than the stoichiometric amount necessary to fully react with one of the crosslinkable functional moieties.

As discussed in the grand-parent application PCT/US2012/055,883, the present inventors have discovered that when methacrylamide (MAM) and a ketone functionalized acrylamide, such as diacetone acrylamide (DAAM), are used in predetermined amounts as monomers for the latex polymer suspended in water they act as self-crosslinking moieties under ambient conditions. After the latex compositions are applied on a substrate or surface without using heat or dryers, a crosslinking reaction takes place.

However, substantially no crosslinking reaction in the aqueous phase occurs during storage. Without being bound to any particular theory, the present inventors believe that the self-crosslinking reaction occurs through particle-to-particle or inter-polymer chain interactions of the functional groups, e.g., methacrylamide and diacetone acrylamide moieties, incorporated onto the polymer chains. Molecular inter-diffusion between neighboring latex particles, which is important for the generation of latex film strength takes place prior to the crosslinking reaction. However, strongly crosslinked particles are unable to inter-diffuse. It is also believed that the primary amide nitrogen on the methacrylamide unit may react with the carbonyl group of the diacetone acrylamide unit or other active carbonyl groups to form an imine linkage. Inter-chain hydrogen bonding and chain entanglements are also likely to be present, which further enhances the mechanical strength of the film. The hydroxyl group in hydroxyethyl cellulose (HEC) grafting may also play certain functions for the ambient crosslinking in our system.

In one embodiment, diacetone acrylamide (DAAM) or diacetone methacrylamide (DAMAM) monomer is copolymerized as part of the latex particles and functions as a self-crosslinking moiety. Instead of or in addition to DAAM, diacetone methacrylamide (DAMAM) and/or acetoacetoxyethyl methacrylate (AAEM) can be used singly or with each other.

In another embodiment, methacrylamide (MAM) and/or acrylamide (AM) monomer is copolymerized as part of the latex particles and functions as another self-crosslinking moiety.

In one preferable embodiment, latex particles are polymerized from film forming monomers, including diacetone acrylamide (DAAM) and methacrylamide (MAM) in a predetermined ratio relative to each other (DAAM/MAM) and in an amount together (DAAM+MAM) relative to the total amount of the film forming monomers by weight. Film forming monomers are the monomers that form the dried polymeric film or dried paint layer (polymeric film, pigments and colorants, etc.). Suitable film forming monomers include but are not limited to vinyl monomers, acrylic monomers and styrene monomers, discussed in detail below. These monomers are polymerized to form latex particles suspended in an aqueous solution, which cross-link to each other to form a film or paint layer. In one embodiment, the film forming monomers do not include the crosslinkable monomers/moieties discussed above, such as DAAM, DAMAN, AAEM, MAM or AM.

Preferably the ratio by weight of diacetone acrylamide or the likes (e.g., DAMAM or AAEM) to methacrylamide or the likes (e.g., acrylamide) in the latex particles ranges from about 20:1 to about 1:20 by weight. More preferably the ratio by weight of diacetone acrylamide to methacrylamide in the latex particles ranges from about 6:1 to about 1:3. Most preferably the ratio by weight of diacetone acrylamide to methacrylamide in the latex particles ranges from about 4:1 to about 1:2. Said ratio can also be from about 10:1 to 1:10, or 4:1 to 1:2 or 2:1 to 1:1 by weight.

Preferably the weight ratio of diacetone acrylamide and methacrylamide to the film forming monomers ranges from about 0.1:100 to 10:100. More preferably, the ratio of the weight of diacetone acrylamide and methacrylamide to the film forming monomers ranges from about 0.5:100 to 5:100. Most preferably the ratio of the weight of diacetone acrylamide and methacrylamide to the film forming monomers ranges from about 1:100 to 3:100.

The present invention also relates to the impact of the crosslinking on the properties of the coating or film formed from the composition, particularly on the mechanical, chemical, physical, and physico-chemical properties of the coating. These properties can include, but are not limited to, the minimum film forming temperature ("MFFT"), block resistance, scrub resistance, molecular weight, pencil hardness, viscosity, water resistance, water stain resistance, scratch resistance, shelf/incubation stability, and the like, and combinations thereof.

Preferably acrylic monomers principally form the latex particles that the MAM and DAAM form moieties thereon. Any acrylic monomers can be used in the present invention. Suitable acrylic monomers include, but are not limited to methyl acrylate, ethyl acrylate, methyl methacrylate, and ethyl methacrylate, butyl acrylate and butyl methacrylate, iso-octyl methacrylate and acrylate, lauryl acrylate and lauryl methacrylate, 2-ethyl hexyl acrylate, steatyl acrylate and methacrylate, isobornyl acrylate and methacrylate, methoxy ethyl acrylate and methacrylate, 2-ethyoxy ethyl acrylate and methacrylate, 2-hydroxyethyl acrylate, 2-hydroxybutyl, dimethylamino ethyl acrylate and methacrylate, acrylates, alkyl (meth) acrylic acids such as methyl acrylic acids, wet adhesion monomers, such as N-(2-methacryloyloxyethyl) ethylene urea, and multifunctional monomers such as divinyl benzene, diacrylates, for crosslinking functions etc., acrylic acids, ionic acrylate salts, alkacrylic acids, ionic alkacrylate salts, haloacrylic acids, ionic haloacrylate salts, acrylamides, alkacrylamides, monoalkyl acrylamides, monoalkyl alkacrylamides, alkyl acrylates, alkyl alkacrylates, acrylonitrile, alkacrylonitriles, dialkyl acrylamides, dialkyl alkacrylamides, hydroxyalkyl acrylates, hydroxyalkyl alkacrylates, only partially esterified acrylate esters of alkylene glycols, only partially esterified acrylate esters of non-polymeric polyhydroxy compounds like glycerol, only partially esterified acrylate esters of polymeric polyhydroxy compounds, and combinations thereof. The alkyl methacrylate monomer is preferably methyl methacrylate.

Preferred monomers containing aromatic groups are styrene and α-methylstyrene. Other suitable monomers containing aromatic groups include, but are not limited to, 2,4-diphenyl-4-methyl-1-pentene, 2,4-dimethylstyrene, 2,4,6-trimethylstyrene, 2,3,4,5,6-pentafluorostyrene, (vinylbenzyl) trimethylammonium chloride, 2,6-dichlorostyrene, 2-fluorostyrene, 2-isopropenylaniline, 3(trifluoromethyl)styrene, 3-fluorostyrene, α-methylstyrene, 3-vinylbenzoic acid, 4-vinylbenzyl chloride, α-bromostyrene, 9-vinylanthracene, and combinations thereof.

Preferred monomers containing primary amide groups are methacrylamide, and acrylamide. Other suitable monomers containing amide groups include, but are not limited to, N-vinylformamide, or any vinyl amide, N,N-dimethylacrylamide, N-(1,1-dimethyl-3-oxobutyl)(meth)acrylamide, N-(hydroxymethyl)(meth)acrylamide, N-(3-methoxypropyl)acrylamide, N-(butoxymethyl)acrylamide, N-(isobutoxymethyl) acryl(methacryl)amide, N-[tris(hydroxymethyl)methyl] acryl(methacryl)amide, 7-[4-(trifluoromethyl)coumarin] (meth)acrylamide, 3-(3-fluorophenyl)-2-propenamide, 3-(4-methylphenyl)acrylamide, N-(tert-butyl)(meth)acrylamide, and combinations thereof. These monomers can be polymerized with acrylic monomers, listed above. General formula for vinyl(form)amides:

and (meth)acrylamides:

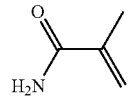

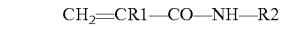

where R1 is H, $CH_3$, $CH_2CH_3$, or other substituted functional groups, and R2 can be —H, —$CH_3$, —$CH_2CH_3$, and other substituted organic functional groups.

Suitable styrene monomers include, but are not limited to, styrene, methylstyrene, chlorostyrene, methoxystyrene and the like. In this embodiment, styrene monomers are preferably co-polymerized with methacrylamide and acrylamide monomers.

In one embodiment, the aqueous latex polymer may also comprise vinyl monomers. Monomers of this type suitable for use in accordance with the present invention include any compounds having vinyl functionality, i.e., —CH═$CH_2$ group. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl propionate, vinyl laurate, vinyl pivalate, vinyl nonanoate, vinyl decanoate, vinyl neodecanoate, vinyl butyrates, vinyl caproate, vinyl benzoates, vinyl isopropyl acetates and similar vinyl esters; nitrile monomers, such acrylonitrile, methacrylonitrile and the like; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

Preferably, the film forming monomers are the principal monomers in the latex and the two crosslinkable moieties make up small portions of the latex, as discussed in the ratios above. The film forming monomers preferably make up more than about 75% by weight of the latex particles, more preferably more than about 85% and more preferably more than about 90%.

The present inventors have conducted a number of experiments to show the efficacy of the self-crosslinkable polymer latex with at least two types of crosslinkable moieties. Each moiety may exist at multiple locations in the latex particles. These moieties may crosslink a single latex particle to itself (intra particle cross-linking); however as shown in the Examples below, they could crosslink to other latex particles (inter particle cross-linking) to form a strong paint film. It is noted that Examples 1-6 discussed below were reported in the parent PCT international application as Examples 4, 5A, 5B, 6, 8 and 9, respectively. As discussed below, these examples and others illustrate the inventive use of the MAM and DAAM moieties to crosslink latex polymers.

The crosslinking is demonstrated by measuring water sensitivity of dried latex films. The procedure for the water sensitivity test is described in the Material and Methods section, as shown below. Films were dried under ambient conditions before the water sensitivity test was performed. The results for the water sensitivity tests for latexes from Examples 1-3 are shown below. In Example 1 the latex contains both diacetone acrylamide (DAAM) and methacrylamide (MAM) moieties in the composition; Example 2 contains MAM but not DAAM moiety; and Example 3 contains DAAM but not MAM. As shown below, the dried film of Example 1 has significantly better water resistance, suggesting significantly more crosslinking when DAAM is used with MAM even when no heat or dryer is used. In contrast, when either one of these two components, DAAM and MAM, is omitted as in the cases of Examples 2 and 3, the resulting dried latex is very sensitive to water, which means that the crosslinking is unsatisfactory. No crosslinking agent, such as ADH, is added to the aqueous composition in Examples 1-3. Comparative Experiment A shows the results of water sensitivity tests performed on latex films of Examples 1-3 made with the inventive latex.

Examples 4, 5 and 6 all have MAM/DAAM crosslinking moieties in addition to hydroxyl cellulose (HEC) in the composition. Example 5 and 6 further contains methylol methacrylamide monomer to improve latex stability and the dried film's water permeability.

The self-crosslinking under ambient conditions when the latex is coated on a substrate using the DAAM/MAM does not require any dryer, or a crosslinking agent in water phase, e.g. ADH, to initiate the crosslinking. This novel combination also minimizes the volatile organic compounds (VOC) or odor issues associated with conventional two-component approaches, such as DAAM in the latex and adipic dihydrazide (ADH) in the water phase discussed above. Meanwhile it improves the film's mechanical strength, and extends the storage life of the latex in the aqueous phase. Preferably, the latex composition is substantially free of water borne crosslinking agents, such as adipic dihydrazide or the like. Water molecules appeared to play a significant role in latex stability. The premature crosslinking reactions are significantly restricted in the presence of water, probably because particle-particle inter-diffusions or inter-chain interactions are hindered. The latex sample disclosed in Example 1 remains stable even after one year of storage and the dry film formed from this aged latex still exhibits excellent water sensitivity and crosslinking ability.

The performances in terms of the scrub resistance, block resistance, water sensitivity, and water stain are related to crosslinking. A paint from a commercial latex which does not contain any DAAM or MAM functional monomers in its composition was used as a control for comparison with paints made from inventive latex samples of Examples 7-10 as shown in Comparative Experiment B. The control sample did not form a cross-linked dry film and has relatively poor scrub resistance and water sensitivity compared with the paints made with inventive latexes of Examples 7-10 which are incorporated with self-crosslinking functional monomers DAAM and MAM, but which are substantially free of ADH. The results clearly demonstrate that the addition of DAAM and MAM as a functional moiety pair to the polymer chains constitutes a novel approach to achieve ambient cross-linking without a crosslinking agent in the water phase such as adipic dihydrazide (ADH).

Example 11 shows an inventive core/shell latex with the DAAM and MAM moieties in the shell and Examples 12 to 14 show core/shell latexes with only one DAAM or MAM moiety. These latexes are prepared in a two-stage process, allowing additional control over the composition and structure of the polymer films. The first stage process produces a core of the latex and the second stage provides a shell for the latex. The core is provided with a non-ambient crosslinker (also called crosslinking monomers), e.g. 1,4-butanediol diacrylate (i.e. SR-213) in the pre-emulsion composition and no MAM or DAAM is present in the first stage pre-emulsion composition. The crosslinking of the core polymers imparts improved hardness and weathering property to the resulting latex.

In Example 11, the shell contains both DAAM and MAM moieties and the latex is capable of crosslinking when the aqueous environment is at least partially depleted of water. The shell composition of Example 12 is different from Example 11 only in that the former contains no MAM monomer in the pre-emulsion composition. On the other hand, shell compositions of Examples 13 and 14 lack DAAM in contrast to Example 11. Example 14 is further different from Example 11 in that the BA monomer is replaced with 2-EHA.

Comparative Experiment C shows the physical and mechanical properties of paint samples made from the core-shell latexes in Examples 11-14. This comparative experiment shows the efficacy of having the DAAM and MAM moieties on the shell or second phase of the core-shell latex. It demonstrates the effectiveness of ambient curing/crosslinking using block resistance as an indicator. A paint film was drawn down on a Leneta card for each latex sample. It was dried for 7 days at room temperature before being placed into a 120° F. oven for 24 hours. The block resistance was rated on a numerical scale of 1 to 5 with 5 being the best. The block resistance test was conducted according to ASTM_D4946-89. The results for the above examples demonstrated that the MAM/DAAM moiety pair formed a cross-linked networks effectively at ambient temperature, which improved the block resistance of the paint sample made with inventive Example 11.

The paint sample with the MAM and DAAM crosslinking pair shows superior physical and mechanical properties in comparison with a control paint sample without any crosslinkers. Comparative Experiment D compares the performance of paints made from inventive examples 15 and 16, both of which have MAM/DAAM crosslinkers with control paint Example 1, which does not use a crosslinking latex. While both paints using inventive latex have the same block resistance as the control paint Example 1 which does not have any crosslinker, they show other superior mechanical and physical properties.

The effectiveness of the inventive crosslinking between MAM and DAAM moieties was further compared in Comparative Experiment E with a paint sample that uses a single conventional crosslinking moiety, such as DAAM, and a crosslinking agent, such as ADH, in the water phase. The performance of these two paints is comparable. The inventive paint is made of Example 16 latex and contains the MAM and DAAM crosslinking moiety pair. The paint control Example 11 is made of a latex containing the DAAM moiety and the ADH crosslinking agent in the water phase. This result shows that the scrub resistance of the paints using the inventive latex containing MAM and DAAM is somewhat better than the paint using latex containing DAAM and ADH in the water phase and the water resistances of the two paint samples are identical.

More direct evidence for the self-crosslinking of the latex under ambient conditions is provided by Examples 17 and 18. The molecular weights of the samples were measured on a GPC instrument from WATERS Corp. The molecular weight analysis was first performed on the latex samples before curing. Then, the latex samples were drawn into a three mil thickness film and dried. It is observed that there were insoluble gels for both samples in the solvent used for the Mw analysis and the gels would not dissolve even by solvent heating. Molecular weight analysis for the soluble portion of the 7-day cured film was made. The presence of the insoluble gel even at an elevated temperature (in Tetrahydrofuran-THF solvent and about 70° C.) is consistent with the crosslinking of the latex and make it difficult to dissolve, i.e., thus improving solvent resistance. The polymer converts to thermoset matrix after it is cross-linked and loses its chain mobility. One of the polymer thermoset features is the superior solvent/chemical resistance, which renders it non-soluble or difficult to dissolve in strong organic solvent. It is also common practice to measure the degree of crosslinking through solvent solubility test and swell ratio measurement.

The soluble portions of the two cured samples also show increased molecular weights. For the cured sample from Example 17, the molecular weight of the soluble portion increases from 161K to 178K. The sample from Example 18 shows a similar degree of increase, from 159.2K to 180.3K. This result is consistent with the crosslinking of the polymers, resulting in an increase of the measured molecular weight.

Without being bound to any particular theory, the present inventors believe that in a conventional two-component cross-linking system, such as in the case of DAAM and ADH, component ADH is water soluble and can move freely in the aqueous latex compositions or paints. ADH or hydrazide containing particles can then react with the DAAM resulting in premature crosslinking while the aqueous latex compositions or paints are still in storage. In contrast, in the inventive DAAM and MAM crosslinking system, both the DAAM and MAM units are moieties or parts of the latex particles and water acts to separate the latex particles away from each other thereby inhibiting cross-linking while being dispersed in water. On the other hand, when the latex is drying or dried, the DAAM and MAM moieties can react more readily resulting in better mechanical strength of the dry film as demonstrated in Example 1.

It is to be understood that the present approach is not limited to the DAAM and MAM combination but can be tailored to different functional group combinations for many other applications. Although there may be some limited intra-particle/intra-chain crosslinking, the present inventors believe that the majority of the crosslinking reactions occur when the latex particles inter-diffused in contact with neighboring particles during the drying and coalescence process. This conclusion is supported by the observations that a latex sample of Example 1 which has stored for one year still maintained its crosslinking ability, when it was coaled on a substrate under ambient conditions as described above.

As used herein, the term "substantially free" or "substantially without", referring to a component in a composition, mean that the composition comprises not more than about 1 wt %, preferably not more than about 0.5 wt %, more preferably not more than about 0.1 wt %, most preferably not more than about 0.02 wt %, or in some cases completely none (about 0%), of the component.

The present invention may be understood more readily by reference to the following description of the invention, and to the Examples included therein.

Before the present compositions of matter and methods are disclosed and described, it is to be understood that this invention is not limited to specific synthetic methods or to particular formulations, unless otherwise indicated, and, as such, may vary from the disclosure. It is also to be understood that the terminology used is for the purpose of describing particular embodiments only, and is not intended to limit the scope of the invention.

EXAMPLES

Material and Methods

Particle size distribution is determined by Microtrac 250 particle size analyzer using light scattering technology. Particle size means an average particle size based on the diameter of the particles.

Rheological curves are measured by a Bohlin CVO Rotational Viscometer (0.5° cone and 40 mm diameter plate).

The water sensitivity test (1 minutes and 5 minutes water spot test) is illustrated by the following procedures. Emulsion latex samples were drawn down on a sealed Leneta card (made by BYK for example) to form a dry film using a BYK-GARDNER 3 MIL WET FILM draw down bar. The latex film was air-dried on a flat horizontal surface for one week before testing. To the dried film surface, 3-5 drops of water were placed and the water sensitivity of the latex film was rated using the finger nail scratching method for rating the dry film strength after 1 minute and 5 minute soaking periods. The wet films are rated for resistance to finger nail scratching from 1 to 5, with 5 being the best.

The water stain resistance is tested by a visual rating of water stain on the dried paint film. A 3 mil film of paint is dried for 7 days at room temperature, and 3 ml of DI water is placed on the horizontal dried paint film for 3 minutes, and then the Leneta card is raised to a vertical position to allow water to flow down across the surface of the film. The film is placed in a vertical position while the water evaporates. The water stain mark on the film surface is visually inspected and assigned a number from 1 to 5, 5 being the best and 1 being the worst.

Water vapor permeability for grafted and control acrylic latex samples was measured by an internal method which followed the procedures given by the ASTM D1653-93 method (standard test methods for water vapor transmission of organic coating films). The test specimen was sealed to the open mouth of a cup or dish containing water, and the assembly was placed in a controlled atmosphere environment at constant humidity and temperature. The permeability cups used for the testing were BYK-Gardner PO-2301 (25 cm$^2$) and the parchment paper for vapor permeability test were from All-State International, Inc. The drawdown films were made on a parchment paper using the latex samples with a 3-mil drawdown bar and then the films were dried for one week before the water vapor permeability measurement. The dried film was cut into a proper size for the cup, the thickness of the film and paper was measured, and the weight of each coating sample was recorded. The permeability cup was filled with deionized water and the opening was sealed with the dry film. The samples were weighed to the 0.0001 g accuracy before and after 24 hours evaporation. The permeability was calculated using the formulae defined in section 13 of ASTM method D1653-93.

The molecular weights were measured on a GPC instrument from WATERS Corp. The molecular weight analysis was performed on the latex samples (before curing). The latex samples were then drawn into three mil thickness films and dried for 7 days. The molecular weights of cured samples were measured on the soluble portion in THF solvent. The molecular weights reported are all weight average molecular weights using polystyrene calibration standards.

As used herein, MFFT is the minimum temperature at which the latex will form a continuous film. MFFT was determined on a MFFT Bar-90 from Rhopoint Instruments according to ASTM D2354-98 and ISO 2115:1996) (American Standard Test Method for Minimum Film Formation Temperature). The emulsions were applied using a 75 micron cube applicator to form tracks. Emulsions were allowed to dry for 3 hours. The MFFT were determined as points on tracks where the film has coalesced over 90% of the track width (no cracking).

The MFFT of the inventive latexes range from about −10° C. to about 50° C., preferably about −5° C. to about 28° C., more preferably about 2° C. to about 25° C. and most preferably about 4° C. to about 18° C.

Block resistance, or the propensity of a coating to adhere to itself instead of to its substrate, was measured according to a modified version of ASTM D4946-89. On a sealed white Leneta™ WK card, a 3 mil thick coating was prepared. After one week of drying at room temperature, the coating was cut into four one inch squares. Two of the squares were oriented face to face (i.e., coated sides touching) and are placed under a 100-gram weight in a 120° F. oven for about 24 hours. The other two of the squares were oriented face to face and placed under a 100-gram weight at room temperature for about 24 hours. Both sets of face to face squares were then allowed to equilibrate to ambient temperature for about ½ hour. Each set of squares was then pulled apart using a slow and steady force, forming a T pattern. Block resistance was rated based on the percentage of area of the paint on one surface that was transferred to the other surface. 0% transfer indicates a perfect blocking resistance while 100% transfer indicated paints on both sides are completely stuck together.

The residual monomers were measured by a gas chromatography (GC) instrument equipped with a FID or a Mass detector. This method is the industry accepted standard procedure for testing residual monomers, and is known to those of ordinary skill in the art.

Scrub Test. The scrub resistance is determined by ASTM Method D2846. In this test, a 7 mil drawdown of paint(s) is prepared on a scrub panel and allowed to air dry at room temperature for one week. A medium bristle brush is soaked overnight in deionized water for conditioning prior to running the test. Two glass plates are placed in the tray of the Abrasion tester, and three brass shims are placed on the plates in such a way that each paint being tested would have a shim under it. The test panel with the dried paint is secured to the two glass plates on the Gardner Abrasion Tester. Ten grams of abrasive scrub medium are applied to the bristles of the brush and the brush is then placed in a brush holder which is secured to the cables of the Abrasion Tester. Five cc of deionized water is applied to the test panel, and the scrub cycles are started. Every 400 cycles another 10 g of abrasive medium is applied to the brush and another 5 cc of deionized water is applied to the panel. The test is continued until paint is removed in one continuous line across its own shim and the number of cycles required to reach this point is recorded.

| Monomers (grams) | Examples | | | | | | | | | |
|---|---|---|---|---|---|---|---|---|---|---|
| | 1 | 2 | 3 | 4 | 5 | 6 | 7 | 8 | 9 | 10 |
| MMA | 270.5 | 290.0 | 300.6 | 259.3 | 265.3 | 278.7 | 254.0 | 270 | 251.0 | 265.3 |
| BA | 310.9 | 309.0 | 374.4 | 322.5 | 306.6 | 252.7 | 311.0 | 310 | 308.0 | 307.4 |
| 2-EHA | | | 23.2 | | 25.6 | 84.3 | | | | 19.2 |
| MAA | 4.7 | 4.4 | 6.2 | 5.2 | 5.4 | 5.3 | 4.7 | 4.8 | 5.4 | 5.5 |
| AA | | | | | | | | | | |
| Vinyl neodecanoate (VeoVa ™ 10) | | | | | | | | | | |
| Styrene | 29.5 | 12.9 | 40.0 | 29.8 | | | 38.6 | 29.5 | 51.5 | 12.8 |
| N-(2-methacryloyloxyethyl) ethylene urea | 25.7 | 26.3 | 17.5 | 25.9 | 25.6 | 11.7 | 26.5 | 25.7 | 25.8 | 25.6 |
| N-Methylol methacrylamide | | | | | 7.4 | 7.8 | | | | |
| DAAM | 2.9 | | 3.4 | 2.9 | 2.9 | 2.6 | 4.5 | 2.9 | 0.7 | 2.9 |
| MAM | 2.5 | 2.6 | | 2.5 | 2.6 | 5.2 | 1.8 | 2.5 | 3.2 | 2.5 |
| 1,4-butanediol diacrylate (i.e. SR-213) | | | | | | | | | | |
| DAAM & MAM to total latex monomers | 0.84 | 0.40 | 0.44 | 0.83 | 0.86 | 1.20 | 0.98 | 0.84 | 0.60 | 0.84 |

-continued

|  | Examples | | | | | | | | | |
|---|---|---|---|---|---|---|---|---|---|---|
| Monomers (grams) | 1 | 2 | 3 | 4 | 5 | 6 | 7 | 8 | 9 | 10 |
| DAAM/MAM ratio | 1.16 | | | 1.16 | 1.12 | 0.50 | 2.50 | 1.16 | 0.22 | 1.16 |
| Test of paints | † | † | † | | | | ‡ | ‡ | ‡ | ‡ |

† See Comparative Experiment A
‡ See Comparative Experiment B

|  | Examples | | | | | | | | | | | |
|---|---|---|---|---|---|---|---|---|---|---|---|---|
|  | 11 | | 12 | | 13 | | 14 | | | | | |
| Monomers (grams) | Stage1 | Stage2 | Stage1 | Stage2 | Stage1 | Stage2 | Stage1 | Stage2 | 15 | 16 | 17 | 18 |
| MMA | 284.0 | 330.0 | 284.0 | 330.0 | 284.0 | 330.0 | 284.0 | 330.0 | 430.0 | 430.0 | 675.5 | 676.5 |
| BA | 118.4 | 281.0 | 118.4 | 281.0 | 118.4 | 281.0 | | | | 435.0 | 424.0 | 606.0 | 603.0 |
| 2-EHA | | | | | | | 118.4 | 281.0 | | | | |
| MAA | | 10.2 | | 10.2 | | 10.2 | | 10.2 | 9.0 | 8.2 | 14.0 | |
| AA | 4.0 | | 4.0 | | 4.0 | | 4.0 | | | | | |
| Vinyl neodecanoate (VeoVa ™ 10) | | 460.1 | | 460.1 | | 460.1 | | 460.1 | | | | |
| Styrene | | | | | | | | | | 27.1 | | |
| N-(2-methacryloyloxyethyl) ethylene urea | | 21.3 | | 21.3 | | 21.3 | | 21.3 | 19.2 | 18.2 | 30.6 | 30.6 |
| N-Methylol methacrylamide | | | | | | | | | | | | |
| DAAM | | 1.6 | | 1.6 | | | | | 8.3 | 12.2 | 18.2 | 22.5 |
| MAM | | 1.2 | | | | 1.2 | | 1.2 | 5.5 | 2.8 | 4.2 | 5.1 |
| 1,4-Butanediol diacrylate (i.e. SR-213) | 1.6 | | 1.6 | | 1.6 | | 1.6 | | | | | |
| DAAM & MAM to total latex monomers | | 0.25 | | 0.15 | | 0.11 | | 0.11 | 1.52 | 1.63 | 1.66 | 2.06 |
| DAAM/MAM ratio | | 1.33 | | | | | | | 1.51 | 4.36 | 4.33 | 4.41 |
| Test of paints | § | | § | | § | | § | | §§ | §§ | | |

§ See Comparative Experiment C
§§ See Comparative Experiments D and E

Example 1

To a 5-liter 4-necked round bottom glass reactor equipped with a mechanical stirrer, a thermocouple, a condenser, and nitrogen purge, 445.0 g of deionized (DI) water and 2.0 g of emulsifier which is a branched sodium dodecylbenzene sulfonate (i.e., Rhodacal® DS-4 std), were added and heated to 79° C.

To an Erlenmeyer flask, the following ingredients were added and stirred to form a stable monomer pre-emulsion. Monomer pre-emulsion composition:

| | |
|---|---|
| Methyl methacrylate (MMA) monomer | 270.5 g |
| Butyl acrylate (BA) monomer | 310.9 g |
| Methacrylic acid (MAA) monomer | 4.7 g |
| Methacrylamide (MAM) monomer | 2.5 g |
| Diacetone acrylamide monomer (DAAM) | 2.9 g |
| Styrene monomer | 29.5 g |
| N-(2-methacryloyloxyethyl) ethylene urea | 25.7 g |
| DI water | 210.0 g |
| Sodium dioctyl sulfosuccinate surfactant (75% active) | 2.2 g |
| Tetrasodium N-(1,2-dicarboxyethyl)-N-octadecyl sulfosuccinamate surfactant (35% active) | 3.8 g |
| Ammonium salt of phosphate ester surfactant (100%) | 1.0 g |

Suitable surfactants include AEROSOL® 22 and AEROSOL® OT-75 made by Cytec Industries and POLYSTEP TSP-16PE. About 1.9 g of ammonium hydroxide (28%) was also added to the monomer mix for pH adjustment.

About 10 ml of 12.8% aqueous potassium persulfate (KPS) initiator solution and 35.0 g of the monomer pre-emulsion were charged to the reactor at 79° C. to form seed particles. After about 20 minutes at 79° C. with agitation, the delay feed of the monomer pre-emulsion together with 30 ml of 4.2% aqueous KPS initiator solution was started. The delay feed rate for the reaction was as follows:
about 4.6 ml/min for the first hour; and
about 5.5 ml/min for the remaining monomers.

In a separate container, 3.2 g of hydroxyethyl cellulose (HEC) and 88.0 g of DI water were mixed together. This HEC solution was mixed with the last 15% of the monomer pre-emulsion. The following additional surfactants were also added into HEC solution at this stage:

| | |
|---|---|
| (i) branched alcohol ethoxy phosphate surfactant or polyoxyethylene tridecyl ether phosphate (25% active) | 6.0 g |
| (ii) ammonium salt of phosphate ester surfactant (100% active) | 3.0 g |

Suitable phosphate ester surfactants include but are not limited to tristyrylphenol ethoxylate phosphate ester. The tristyrylphenol ethoxylate phosphate ester (100% solids) was diluted with DI water in 20% and neutralized with ammonium hydroxide to the pH value of 9.5-10.0 before use. 17 g of 20% tristyrylphenol ethoxylate phosphate ester (neutralized) was used in the above example. The addition of extra surfactants together with HEC solution was surprisingly effective in preventing the gel formation from the grafting.

About 15-30 minutes after the feed, the batch became viscous and then returned to a workable viscosity again after holding the temperature at 82° C. for an additional 30-60 minutes. The batch was cooled down to 65-68° C., and chasers (t-butyl hydroperoxide and sodium formaldehyde sulfoxylate) and ammonium hydroxide were added with agitation. The properties of the produced latex were shown in the following table.

| Solids | pH | MFFT (° C.) | Particle size (MV) | Particle size (mV) | Mechanic Stability |
|---|---|---|---|---|---|
| After filtration 43.0% | pH meter 8.0 | Rhopoint WP 12.8 | Before HEC addition 145 nm | After HEC addition 543 nm | 10,000 rpm >30 min. |

As discussed above, this HEC grafted acrylic latex sample showed excellent water resistance and was water permeable. Water permeability results are shown in the following table. This property allows applications in areas outside the paint industry, e.g., the HEC grafted acrylic latex may be suitable as a material for contact lenses.

| Sample ID | Specific Permeability[3] mg/cm$^2$.mm.24 hr |
|---|---|
| Control latex without HEC[1] | 0.38 |
| HEC grafted Latex[2] | 1.01 |

[1]Control acrylic latex sample without any HEC during the reaction.
[2]HEC grafted acrylic latex sample from example 1. HEC is about 0.5% vs. total weight of monomers.
[3]See Material and Methods Section Example 2

To the same reactor setup as described in Example 1, 460 g of DI water and 0.65 g of sodium bicarbonate were added. The reactor was heated to 78° C. and agitated at 160 RPM. The following ingredients were mixed to form monomer pre-emulsion.

| Monomer pre-emulsion composition | |
|---|---|
| Methyl methacrylate (MMA) monomer | 290.0 g |
| Butyl acrylate (BA) monomer | 309.0 g |
| Methacrylic acid (MAA) monomer | 4.4 g |
| Methacrylamide (MAM) monomer | 2.6 |
| Styrene monomer | 12.9 g |
| N-(2-methacryloyloxyethyl)ethylene urea | 26.3 g |
| DI water | 226.0 g |
| Sodium dioctyl sulfosuccinate surfactant | 6.0 g |
| Blend of anionic and nonionic surfactants | 3.0 g |

A suitable example of a blend of anionic and nonionic surfactants can be Cytec XSM 1110 (50% active). After the monomer pre-emulsion formed, 2.9 g of ammonium hydroxide (28%) was added to the monomer emulsion for a pH of 6.2.

About 41.0 g of this monomer emulsion and about 10 ml of 12.6% aqueous potassium persulfate (KPS) initiator solution were charged into the reactor for seed. After 20 minutes of heating at 79° C., seed particles formed, and the monomer pre-emulsion was fed into the reactor at the following rate:
about 4.6 ml/min. for the first hour; and
about 5.5 ml/min. for the rest of the monomer emulsion.
About 25 ml of 4% KPS initiator in DI water was also co-fed with the monomer emulsion.

When about 8-10% of total monomer pre-emulsion was remaining, 83 g of 3.9% HEC solution in DI water together with 5.2 g of RHODAFAC® RS610/A25 and 5.5 g of AEROSOL® 22 surfactants were added to the 8-10% remaining monomer emulsion to complete the delay feed in 40-60 minutes. The totals were fed completely in about 3 hours and the latex was held at about 82° C. for additional 50-60 minutes and then cooled down to 65° C. Chasers and ammonium hydroxide were added. The properties of the produced latex are shown in the table below.

| Solids | MFFT (° C.) | pH | Particles size (mV) before HEC grafting | Particle size (mV) after HEC grafting |
|---|---|---|---|---|
| 43% | 13 | 8.0 | 191 nm | 239 nm |

The paint sample made with this latex showed water sensitivity due to the absence of the monomer combination methacrylamide/DAAM/styrene. The grafting was not as effective as in Examples 1 and 4 due to insufficient monomer emulsion (about 8%) when HEC was added. The final average particle size (mV) after the HEC grafting reaction was smaller than that of the typical HEC grafted samples which ranges from about 300 nm to about 900 nm.

Example 3

To the same reactor setup as described in Example 1, 534 g of DI water was added. The reactor was heated to 79° C. and agitated at 180 RPM. To a 2 liter Erlenmeyer flask, the following ingredients were mixed together and agitated for at least 20 minutes to form a stable monomer pre-emulsion.

| Monomer pre-emulsion composition | |
|---|---|
| Methyl methacrylate (MMA) monomer | 300.6 g |
| Butyl acrylate (BA) monomer | 374.4 g |
| Methacrylic acid (MAA) monomer | 6.2 g |
| Diacetone acrylamide (DAAM) | 3.4 g |
| Styrene monomer | 40.0 g |
| N-(2-methacryloyloxyethyl) ethylene urea Wet adhesion monomer (50%) | 17.5 g |
| 2-Ethylhexyl acrylate (2-EHA) | 23.2 g |
| DI water | 264.0 g |
| Sodium dioctyl sulfosuccinate surfactant | 2.6 g |
| Tetrasodium N-(1,2-dicarboxyethyl)-N-octadecyl Sulfosuccinamate surfactant (35% active) | 4.6 g |
| Ammonium salt of phosphate ester surfactant | 8.4 g |

After the monomer pre-emulsion formed, 1.7 g of ammonium hydroxide (28%) was added to the monomer emulsion for a pH of 6.5.

About 50.4 g of this monomer emulsion and about 15 ml of 10.6% aqueous potassium persulfate (KPS) initiator solution were charged into the reactor for seeding. After 20 minutes of heating at 79° C., seed particles were formed, and the monomer pre-emulsion was delay fed into the reactor at the following rates:
about 6.5 ml/min. for the first hour; and
about 7.4 ml/min. for the rest of the monomer emulsion.
About 68 ml of 2.4% KPS initiator in DI water was also co-fed with the monomer emulsion.

When about 10-14% of total monomer pre-emulsion was remaining, 99 g of 3.9% HEC solution in DI water together with 7.8 g of polyoxyethylene tridecyl ether phosphate, ammonium salt and 20.4 g of ammonium salt of phosphate ester surfactant (neutralized at 20%) were added into the remaining monomer pre-emulsion and delay fed into the reactor together with KPS solution. The latex became very viscous near the end of the HEC feed but the viscosity would eventually drop after one hour holding. The agitation RPM was raised to ensure proper mixing. The total feed time for the monomers was about 3 hours and the batch was then held at about 82° C. for additional 60 minutes. After the hold, the batch was cooled down to 65° C. and the chasers and ammonium hydroxide were added for reducing residual monomer and pH control. The properties of the produced latex are in following table.

| Solids | MFFT (° C.) | pH | Particles size (mV) before HEC grafting | η (cP) | Particle size (mV) after HEC grafting |
|---|---|---|---|---|---|
| 41.2% | 6.0 | 8.8 | 177 nm | 410 | 639 nm |

Comparative Experiment A

The water sensitivity tests were performed on the latexes of the paint samples for Examples 1-3 following the procedure in the Material and Methods section. The results are summarized in the following table.

| Film Drying time | 4 hrs. | 5 hrs. | 6.5 hrs. | 24 hrs. | 7 days |
|---|---|---|---|---|---|
| Water wetting time | 5 min. | 5/10 min. | 5/10/25 min. | 10 min. | 25 min. |
| Water sensitivity (1-5) Example 1 DAAM/MAM combo | 4+ | 5/4− | 5+/5/4 | Not scratchable 5+ | Not scratchable 5+ |
| Water sensitivity (1-5) Example 2 without DAAM | 0 | Not available | Not available | Poor film strength 1+ | Poor water sensitivity 2 |
| Water sensitivity (1-5) Example 3 without MAM | 1− | 1/1− | 1+/1/0-1 | Poor film strength 2 | Scratchable 3 |

Example 4

HEC Added with 31% Monomer Pre-Emulsion

To the same reactor setup as described in Example 1, 425.0 g of deionized (DI) water was added and heated to 79° C.

To an Erlenmeyer flask, the following ingredients were added and stirred to form a stable monomer pre-emulsion.

| Monomer pre-emulsion composition | |
|---|---|
| Methyl methacrylate (MMA) monomer | 259.3 g |
| Butyl acrylate (BA) monomer | 322.5 g |
| Methacrylic acid (MAA) monomer | 5.2 g |
| Methacrylamide (MAM) monomer | 2.5 g |
| Diacetone acrylamide (DAAM) monomer | 2.9 g |
| Styrene monomer | 29.8 g |
| N-(2-methacryloyloxyethyl)ethylene urea Wet adhesion monomer | 25.9 g |
| DI water | 210.0 g |
| Sodium dioctyl sulfosuccinate surfactant (AEROSOL ® OT-75) (75% active) | 2.1 g |
| Tetrasodium N-(1,2-dicarboxyethyl)-N-octadecyl Sulfosuccinamate surfactant (AEROSOL ® 22) (35%) | 5.2 g |
| Ammonium salt of phosphate ester surfactant (100%) | 0.6 g |

About 1.8 g of ammonium hydroxide (28%) was also added for pH adjustment.

About 15 ml of 8.6% potassium persulfate (KPS) aqueous initiator solution and about 40.0 g of the monomer pre-emulsion were charged to the reactor at 79° C. to form seed particles. After about 20 minute at 79° C. with agitation, the delay feed of monomer pre-emulsion, together with 30 ml of 4.1% aqueous KPS initiator solution was started. The delay feed rate for the reaction was as follows:
  about 4.6 ml/min for the first hour; and
  about 5.5 ml/min for the remaining monomers.

In a separate container, 3.2 g of hydroxyethyl cellulose (HEC) and 91.0 g of DI water were mixed together. This HEC solution (3.5%) and additional surfactants were mixed with the last 31% of monomer pre-emulsion and feeding was continued. When the monomer pre-emulsion was 80-85% fed, the remaining pre-emulsion (20%-15%) was mixed with the following ingredients and the feed was continued.

| | |
|---|---|
| Branched alcohol ethoxy phosphate surfactant (25% active) | 6.0 g |
| Ammonium salt of phosphate ester surfactant (100% active) | 3.4 g |

About 20 minutes after all the ingredients were fed, the latex became viscous, and then reduced to normal viscosity after 45-60 minutes holding the temperature at 82° C. The batch was cooled down to 66° C., and chasers (t-BHP and SFS (sodium formaldehyde sulfoxylate)) and ammonium hydroxide were added. The properties of the produced latex were shown in the table below.

| Solids After filtration | pH pH meter | MFFT (° C.) Rhopoint WP | Particle size (mV) Before HEC addition | Particle size (mV) After HEC addition | Mechanic Stability 10,000 rpm |
|---|---|---|---|---|---|
| 43.6% | 8.0 | 10.1 | 162 nm | 548 nm | >30 min. |

The particle size of this batch showed a bimodal distribution for the sample taken at 45 minutes hold, and uni-modal distribution after 100 minutes hold.

Example 5

To the same reactor setup as described in Example 1, 420 g of DI water was added with nitrogen sweep and agitation at 170 RPM. The following ingredients were mixed to form a monomer pre-emulsion.

| Monomer pre-emulsion composition | |
|---|---|
| Methyl methacrylate (MMA) monomer | 265.3 g |
| Butyl acrylate (BA) monomer | 306.6 g |
| Methacrylic acid (MAA) monomer | 5.4 g |
| Methacrylamide (MAM) monomer | 2.6 g |
| Diacetone acrylamide (DAAM) monomer | 2.9 g |
| 2-Ethylhexylacrylate (2-EHA) monomer | 25.6 g |
| N-(2-methacryloyloxyethyl)ethylene urea wet adhesion monomer | 25.6 g |

-continued

| Monomer pre-emulsion composition | |
|---|---|
| N-methylol methacrylamide monomer | 7.4 g |
| DI water | 220.0 g |
| Sodium dioctyl sulfosuccinate surfactant | 2.3 g |
| Tetrasodium N-(1,2-dicarboxyethyl)-N-octadecyl Sulfosuccinamate surfactant (50%) | 5.4 g |

After the monomer pre-emulsion is formed, about 1.5 g of ammonium hydroxide (28%) was added to the monomer emulsion for pH adjustment.

About 41.0 g of this monomer pre-emulsion and about 10 ml of 12.6% potassium persulfate (KPS) initiator solution were charged into the reactor forming seed particles. After 20 minutes heating at 79° C., the monomer pre-emulsion was delay fed into the reactor at the following rate:

about 4.6 ml/min. for the first hour; and
about 5.5 ml/min. for the rest of the monomer emulsion.

About 30 ml of 4.1% potassium persulfate (KPS) initiator in DI water was also co-fed with the monomer pre-emulsion.

When about 3% of total monomer pre-emulsion was remaining, 94.0 g of 3.9% pre-dissolved HEC water solution, together with 6.0 g of polyoxyethylene tridecyl ether phosphate, ammonium salt and 3.3 g of ammonium salt of phosphate ester (100%) surfactants were added to the 3% remaining monomer emulsion to complete the delay feed in about 50 minutes. The batch was held at 82° C. for additional 50-60 minutes and then cooled down to 65° C. Chasers and ammonium hydroxide were added. The properties of the produced latex were shown in the table below.

| Solids | MFFT (° C.) | pH | Particles size (mV) before HEC grafting | Particle size (mV) after HEC grafting |
|---|---|---|---|---|
| 43.2% | 6.8 | 8.0 | 198 nm | 235 nm |

Example 6

To the same reactor setup as described in Example 1, 435 g of DI water was added with nitrogen sweep and agitation at 170 RPM. The following ingredients were mixed to form a monomer pre-emulsion.

| Monomer pre-emulsion composition | |
|---|---|
| Methyl methacrylate (MMA) monomer | 278.7 g |
| Butyl acrylate (BA) monomer | 252.7 g |
| Methacrylic acid (MAA) monomer | 5.3 g |
| Methacrylamide (MAM) monomer | 5.2 g |
| Diacetone acrylamide (DAAM) monomer | 2.6 g |
| 2-ethylhexylacrylate (2-EHA) monomer | 84.3 g |
| N-(2-methacryloyloxyethyl)ethylene urea wet adhesion monomer (50% solution in water) | 11.7 g |
| N-Methylol methacrylamide monomer (N-MMAA) | 7.8 g |
| DI water | 220.0 g |
| Sodium dioctyl sulfosuccinate surfactant | 2.0 g |
| Tetrasodium N-(1,2-dicarboxyethyl)-N-octadecyl Sulfosuccinamate surfactant (50%) | 5.2 g |
| Ammonium salt of phosphate ester surfactant | 0.4 g |

Suitable phosphate ester surfactants include but are not limited to tristyrylphenol ethoxylate phosphate ester, which may be diluted with DI water. After the monomer pre-emulsion is formed, about 1.8 g of ammonium hydroxide (28%) was added to the monomers for pH adjustment.

About 40.0 g of above monomer pre-emulsion and 10 ml of 13.0% potassium persulfate (KPS) initiator solution were charged into the reactor for seed particles. After 20 minutes heating at 79° C., and the monomer pre-emulsion was delay fed into the reactor at the following rate:

about 4.6 ml/min. for the first hour; and
about 5.5 ml/min. for the rest of the monomer emulsion.

About 30 ml of 4.1% potassium persulfate (KPS) in DI water was also co-fed with the monomer pre-emulsion.

When about 36% of total monomer pre-emulsion remained, 94.0 g of 3.9% pre-dissolved HEC water solution, together with 6.0 g of polyoxyethylene tridecyl ether phosphate, ammonium salt and 3.3 g of ammonium salt of phosphate ester (100%) surfactants were added to the 36% remaining monomer emulsion to complete the delay feed in about 40 minutes. The batch was held at 82° C. for additional 60 minutes and then cooled down to 65° C. Chasers and ammonium hydroxide were added. The properties of the produced latex were shown in the table below.

| Solids | MFFT (° C.) | pH | Particles size (mV) before HEC grafting | Particle size (mV) after HEC grafting |
|---|---|---|---|---|
| 42.4% | 4.3 | 8.0 | 170 nm | 255 nm |

The final average particle was smaller when using 2-ethylhexylacrylate (2-EHA) monomer and N-methylol methacrylamide monomer (VISIOMER® N-MMAA) in the acrylic composition, even when HEC was mixed with higher concentration of monomer pre-emulsion. However, when 2-EHA was used in the acrylic monomer compositions, the particle size distribution of the grafting reaction did not go through a bimodal distribution stage, indicating more resistance to coagulation/gelling. The samples taken at different holding time after the HEC addition all showed unimodal particle distributions.

Example 7

To a three-neck 5 L reactor equipped with a digital agitator and temperature controller was added 445 grams of DI water. The reactor was heated to 82.0° C. with $N_2$ sweep and agitated at a speed of 170-185 RPM. Then a monomer emulsion (41.0 g) of the following composition and KPS (1.35 g) were both charged to the reactor to form latex seeds. After the seed particles were formed in about 20 minutes, the remaining monomer emulsion was fed into the reactor at 5.0 ml/minute. An amount of KPS initiator aqueous solution (30 ml, at 4.1% concentration by weight) was co-fed with the remaining monomer emulsion during the 3 hours feed time.

| Monomer pre-emulsion composition | |
|---|---|
| Methyl methacrylate (MMA) monomer | 254.0 g |
| Butyl acrylate (BA) monomer | 311.0 g |
| Methacrylic acid (MAA) monomer | 4.7 g |
| Methacrylamide (MAM) monomer | 1.8 g |
| Diacetone acrylamide (DAAM) monomer | 4.5 g |
| Styrene | 38.6 g |
| N-(2-Methacryloyloxyethyl)Ethylene Urea 25% Solution in Methylmethacrylate | 26.5 g |
| DI water | 215.0 g |
| Sodium dioctyl sulfosuccinate surfactant (75%) | 2.2 g |
| Tetrasodium N-(1,2-dicarboxyethyl)-N-octadecyl Sulfosuccinamate surfactant | 5.2 g |
| Ammonium hydroxide (28%) | 1.8 g |

Into a separate container equipped with a magnetic stirring bar, hydroxyethyl cellulose (HEC) (3.2 grams) was dissolved in DI water (88 g) for a subsequent use.

After 80%-90% of the monomer emulsion was fed, the above solution of HEC in DI water (88.0 g), phosphate ester surfactant (20%, 16.0 g), and polyoxyethylene tridecyl ether phosphate, ammonium salt (6.0 g) from Rhodia were properly mixed into the remaining monomer emulsion. The resulting monomer emulsion with HEC was fed into the reactor which was held at 82° C. for about another hour to complete the polymerization. The HEC grafting reaction initially increased the viscosity of the batch which would become normal again after ½ hour of agitation during the hold period.

The redox chasers t-BHP and SFS were added into the reactor after the batch was cooled down to about 65° C. for residual monomer reduction. The latex in the reactor was neutralized with ammonium hydroxide aqueous solution until its pH was about 8.3.

Properties of the latex of Example 7

| pH | Solids % | Particle size | MFFT | Mechanical Stability | Film gloss (60°) |
|---|---|---|---|---|---|
| 8.3 | 41.6% | 430 nm | 13.5° C. | Pass | 83 |

Mechanical stability test was conducted by a high speed mixer with a rotational speed range of 10,000-18,000 RPM, e.g., bench top mixer model No. 936 made by Hamilton Beach. A mass of about 250 g-300 g of emulsion latex is placed into a stainless cup and agitated at about 12,000 RPM for 30 minutes. Defoamer agent can be added if the latex becomes foamy due to mixing. If the latex survives the 30 minutes mixing without gelation, the latex emulsion passes the mechanical stability test.

Example 8

Similar to the setup as described in Example 7, DI water (445.0 g) and sodium dodecylbenzene sulfonate (2.0 g) were charged into a reactor which was then heated to 82.0° C. In a separate container, HEC (3.2 g) was dissolved in DI water (88.0 g) in 20-30 minutes with agitation until the solution turned clear.

A monomer emulsion was prepared with the following components. An amount of this monomer emulsion (about 40.0 g) and KPS (1.3 g) were charged into the reactor to form the latex seed particles. The remaining monomer emulsion was then co-fed into the reactor with a KPS solution (30 ml, 3.4% concentration by weight) in about 2.5 hours. The HEC solution prepared above was added to the monomer emulsion remained and feeding was continued. The batch was then held at 82° C. for another 60 minutes to complete the polymerization.

| Monomer pre-emulsion composition | |
|---|---|
| Methyl methacrylate (MMA) monomer | 270 g |
| Butyl acrylate (BA) monomer | 310 g |
| Methacrylic acid (MAA) monomer | 4.8 g |
| Methacrylamide (MAM) monomer | 2.5 g |
| Diacetone acrylamide (DAAM) monomer | 2.9 g |
| Styrene | 29.5 g |
| N-(2-Methacryloyloxyethyl)Ethylene Urea 25% Solution in Methylmethacrylate | 25.7 g |
| Ammonium hydroxide (28%) | 1.9 g |
| DI water | 220 g |

-continued

| Monomer pre-emulsion composition | |
|---|---|
| Sodium dioctyl sulfosuccinate (75%) | 2.2 g |
| Tetrasodium N-((1,2-dicarboxyethyl)-N-octadecyl sulfosuccinamate (35%) | 3.8 g |
| Phosphate ester surfactant (20%) | 5.0 g |

The solids at different time intervals were taken from the reactor and latex particle sizes analyzed. The results are summarized in the following table.

| ID | 20 min seeds | Sample before HEC addition | Sample at the end of reaction |
|---|---|---|---|
| Solids % | 5% | 39.6% | 43.0% |
| Particle size (nm) | 36 nm | 122 nm | 542 nm |

The test results for latex sample are shown the table below.

Properties of the latex of Example 8

| pH | Solids | Particle size | MFFT (° C.) | Mechanical Stability (30 min.) |
|---|---|---|---|---|
| 8.2 | 43.0% | 542 nm | 14.0 | Pass |

Example 9

Similar to the setup as described in Example 7, DI water (445 g) was added and the reactor heated to about 82.0° C. The following components were mixed to form a stable monomer emulsion by agitation.

| Monomer pre-emulsion composition | |
|---|---|
| Methyl methacrylate (MMA) monomer | 251.0 g |
| Butyl acrylate (BA) monomer | 308.0 g |
| Methacrylic acid (MAA) monomer | 5.4 g |
| Methacrylamide (MAM) monomer | 3.2 g |
| Diacetone acrylamide (DAAM) monomer | 0.7 g |
| Styrene | 51.5 g |
| N-(2-Methacryloyloxyethyl)Ethylene Urea 25% Solution in Methylmethacrylate | 25.8 g |
| Ammonium hydroxide (28%) | 1.9 g |
| Sodium dioctyl sulfosuccinate surfactant (75%) | 2.2 g |
| Tetrasodium N-(1,2-dicarboxyethyl)-N-octadecyl sulfosuccinamate surfactant | 5.3 g |
| Phosphate ester surfactant | 16.0 g |
| Polyoxyethylene tridecyl ether phosphate, ammonium salt (25%) | 6.0 g |

To the reactor, ammonium hydroxide (28%, 2.8 g) was added to bring the pH from about 6.0 to 8.3. Other additives such as biocides and stabilizers can also be added to the final emulsion polymer latex. The following table contains the results from the latex sample:

Properties of the latex of Example 9

| pH | Solids | Stability (30 min.) | Particle size | MFFT (° C.) | Film Gloss (60°) |
|---|---|---|---|---|---|
| 8.3 | 43.0% | Pass | 660 nm | 14.0 | 81 |

MFFT is the minimum film forming temperature. Film gloss was measured by a BYK-Gardner gloss meter.

Example 10

To a similar reactor setup described as in the Example 7, DI water (420 g) and sodium dodecylbenzene sulfonate (1.5 g) were added. 42 g of the following monomer emulsion and KPS (1.3 g) were added to the reactor at 82° C. to form the seed particles. The remaining monomer emulsion was fed into the same reactor at a rate of 5.0 ml/minute. In a separate container, HEC (3.30 g) was dissolved in DI water (91 g) for subsequent use.

The following ingredients were mixed together by agitation until a stable monomer emulsion was formed.

| Monomer pre-emulsion composition | |
|---|---|
| Methyl methacrylate (MMA) monomer | 265.3 g |
| Butyl acrylate (BA) monomer | 307.4 g |
| Methacrylic acid (MAA) monomer | 5.5 g |
| Methacrylamide (MAM) monomer | 2.5 g |
| Diacetone acrylamide (DAAM) monomer | 2.9 g |
| Styrene | 12.8 g |
| N-(2-Methacryloyloxyethyl) Ethylene Urea 25% Solution in Methylmethacrylate | 25.6 g |
| 2-Ethylhexylacrylate (2-EHA) monomer | 19.2 g |
| DI water | 220 g |
| Sodium dioctyl sulfosuccinate surfactant (75%) | 2.1 g |
| Tetrasodium N-(1,2-dicarboxyethyl)-N-octadecyl sulfosuccinamate | 5.1 g |
| Tristyrylphenol ethoxylate phosphate ester (20% active) | 1.0 g |
| Ammonium hydroxide (28%) | 1.6 g |

After about 85% of the monomer emulsion had been fed into the reactor, a HEC solution (94.3 g, at a concentration of 3.4% by weight) was added into the remaining monomer emulsion together with tristyrylphenol ethoxylate phosphate ester (18.5 g) and Polyoxyethylene tridecyl ether phosphate (5.8 g) to complete the feed as described in Example 7.

After a one hour hold at 82° C., the batch was cooled down to about 60° C. Redox chasers (t-BHP/SFS) and ammonium hydroxide were added for residual monomer reduction. The table below shows the properties of the obtained latex.

| Properties of the latex of Example 10 | | | | |
|---|---|---|---|---|
| % Solids | MFFT (° C.) | Particle size | pH | Mechanical Stability (30 min.) |
| 43.7% | 8.5° C. | 178 nm | 8.1 | >30 min. Pass |

Comparative Experiment B

Paint samples substantially free of ADH were made from the latexes from Examples 7-10 and commercial latex free of MAM and DAAM using the following procedure. A grind was made from following components in section A in a stainless container. The components were mixed by agitation at a very high RPM for at least 15 minutes before being switched to a lower RPM. The letdown was made from the ingredients in section B.

| SECTION A (Grind) | |
|---|---|
| Water | 35.0 |
| Preservative | 2.0 |
| Mildewcide | 2.5 |
| Acrylic Polymer Dispersant 1 | 9.0 |
| Ethoxylated Nonionic Surfactant 1 (80% in water) | 3.0 |
| TiO2 Pigment | 200.0 |
| Defoamer 1 | 0.75 |
| Additional DI Water | 76.2 |
| 2-Amino-2-methyl-1-propanol (95% in water) co-dispersant | 1.5 |
| Non-ionic surfactant 2 (80% in water) | 5.0 |
| Water | 20.0 |
| SECTION B (Letdown) | |
| HEUR Rheology Modifier | 12.0 |
| Latex binders | 470.0 |
| Acrylic Polymer Open Time Extender (25% in water) | 10.0 |
| Polyurethane Resin (35% in water) | 30.0 |
| Coalescent | 15.0 |
| Suppressor HEA | 4.5 |
| Hydrophobically modified polyether rheology modifier (18% in water) | 17.0 |
| Modified paraffin wax emulsion (38% in water) | 12.0 |
| Fluorosurfactant | 2.0 |
| Propylene Glycol | 12.0 |
| DI Water | 54.2 |

The data on scrub resistance, block resistance, and other related properties were generated from the paint samples made from latex samples 7-10 for comparison purpose. The evaluation methods used are standard ASTM D4946-89, ASTM 2486-06, and ASTM D7190-10 (*American Standard Test Method*) procedures described in the material and methods section. The reference methods can be found in the ASTM website (http://www.astm.org/). The table below shows the scrub resistance, block resistance, water sensitivity and water stain resistance results for the paint samples made from latexes of Examples 7-10. A control sample which contains no crosslinking monomer is included for comparison.

| ID | MAM:DAAM (weight ratio) | Scrub resistance | Block resistance | Water sensitivity (2 min.) | Water stain resistance |
|---|---|---|---|---|---|
| Example 7 | 1:2.5 | 1430 | 5 Pass | 4.5 | 5 |
| Example 8 | 1:1.16 | 1300 | 5 Pass | 4.5 | 5 |
| Example 9 | 1:0.22 | 1043 | 5 Pass | 4.5 | 5 |
| Example 10 | 1:1.16 | 1296 | 5 Pass | 4.8 | 5 |
| Control Sample | N/A | 516 | 5 Pass | 1.5 | 2 |

Example 11

To a similar reactor setup as described in Example 7, DI water (681.0 g) and sodium dodecylbenzene sulfonate (8.5 g) were added and the mixture was heated to a temperature of 81° C. with $N_2$ sweep. The following components were added into an Erlenmeyer flask with agitation until a stable monomer emulsion was formed. To the reactor, an amount of stage I monomer emulsion (70.0 g) together with KPS (2.1 g) was charged. The agitation was maintained at a speed of 190 RPM for about 20 minutes. After the emulsion seed was formed, the rest of the stage I monomer emulsion was fed into the reactor with a KPS solution (27 ml, 0.4% by weight) in about 1 hour and 5 minutes.

Stage I monomer pre-emulsion. (Tg is estimated at about 41.0° C.)

| | |
|---|---|
| Methyl methacrylate (MMA) monomer | 284.0 g |
| Butyl acrylate (BA) monomer | 118.4 g |
| Acrylic acid (AA) | 4.0 g |
| 1,4-Butanediol diacrylate (SR-213) | 1.6 g |
| DI water | 255.6 g |

| | |
|---|---|
| Sodium dodecylbenzene sulfonate (RHODACAL ® DS-4) std (23% active) | 19.9 g |
| Sodium lauryl sulfate (30% active) | 10.5 g |
| Ammonium hydroxide (28%) | 0.6 g |

The Stage II monomer emulsion has the following composition. It was prepared in a similar procedure as disclosed for the stage I monomer emulsion. It was then fed into the reactor after the stage I monomer emulsion feed was finished. The total feed of stage II monomer emulsion and a KPS solution (83 ml, 0.4% by weight) was completed in about 2 hours and 10 minutes. The batch was then held at 82° C. for another 50-60 minutes and cooled down to about 65° C. The redox chasers t-BHP (0.04%) and FF6 (0.03%) were added to the batch for the residual monomer control. The pH value of the latex batch was adjusted with appropriate amounts of ammonium hydroxide. Other preservatives and stabilizers can also be added to the latex batch for improving the shelf life and performances.

Stage II monomer pre-emulsion. The estimated Tg is about 13.9° C.

| | |
|---|---|
| Methyl methacrylate (MMA) monomer | 330.0 g |
| Butyl acrylate (BA) monomer | 281.0 g |
| Methacrylic acid (MAA) monomer | 10.2 g |
| Methacrylamide (MAM) monomer | 1.2 g |
| Diacetone acrylamide (DAAM) monomer | 1.6 g |
| N-(2-Methacryloyloxyethyl)Ethylene Urea 50% Solution In Water (VISIOMER ® 6852-O) | 21.3 g |
| Vinyl neodecanoate (VEOVA ™ 10) | 460.1 g |
| DI water | 582.2 g |
| Sodium lauryl sulfate (30%) | 37.0 g |
| Sodium vinyl sulfonate (SVS) | 3.1 g |
| Sulfosuccinate surfactant (50%) | 10.0 g |
| Ammonium salt of phosphate ester surfactant (20%) | 30.5 g |
| Ammonium hydroxide | 1.2 g |

The latex batch has the following parameters in following table and was made into paint using the similar procedures disclosed in above example.

| Solids % | Particle size | MFFT | Mechanic Stability | pH | Mw | Total residual monomers by GC method |
|---|---|---|---|---|---|---|
| 45.9% | 123 nm | 8.0° C. | >30 min. pass | 8.2 | 110,000 | 0.2% |

Example 12

This experiment was run with the same procedures and composition described in example 11 as a control. However, it contains only DAAM (1.6 g) and no MAM (0.0%) in its second stage monomer emulsion. The block resistance test of the paint sample made from this latex generated poor block resistance result. It failed the block resistance test at 120° F. for 24 hours.

The data in the following table was measured on the latex sample. The smaller particle size is due to the higher surfactant level, sodium dodecylbenzene sulfonate, in the initial water phase.

| Solids % | Particle size | MFFT | Stability | pH | Mw |
|---|---|---|---|---|---|
| 44.9% | 72 nm | 8.0° C. | >30 min. pass | 8.3 | 78,000 |

Example 13

This experiment was run with the same procedures and composition as described in Example 11. However, it contains only 1.2 g of MAM and without any DAAM (0.0%) in its second stage monomer emulsion. The block resistance test of the paint sample made from this latex generated poor block resistance result under the ASTM method conditions of 120° F. for 24 hours. The smaller particle size is due to the higher surfactant level in its water phase. Table 17 shows the test results of the latex sample.

| Solids % | Particle size | MFFT | Mechanic stability | pH | Mw |
|---|---|---|---|---|---|
| 44.3% | 77 nm | 7.0° C. | >30 min. pass | 8.3 | 88,400 |

Example 14

This example was run with the same procedure as described in example 11 except that the there is no DAAM in its composition and that BA monomer was replaced by 2-EHA monomer. The sodium dodecylbenzene sulfonate surfactant is also higher in the initial water phase. Therefore the average particle size (mV) of this batch is also smaller. A person skilled in the arts can easily adjust the surfactant levels and combinations to achieve the desired particle size distributions.

Stage I monomer emulsion. The estimated Tg for stage I polymer is about 41.0° C.

| | |
|---|---|
| Methyl methacrylate (MMA) monomer | 284.0 g |
| Butyl acrylate (BA) monomer | 118.4 g |
| Acrylic acid (AA) | 4.0 g |
| 1,4-Butanediol diacrylate | 1.6 g |
| DI water | 255.6 g |
| Sodium dodecylbenzene sulfonate (23% active) | 19.9 g |
| Sodium lauryl sulfate (30% active) | 10.5 g |
| Ammonium hydroxide (28%) | 0.6 g |

Stage II monomer emulsion. The estimated Tg for stage II is about −1.5° C.

| | |
|---|---|
| Methyl methacrylate (MMA) monomer | 330.0 g |
| Methacrylic acid (MAA) monomer | 10.2 g |
| Methacrylamide (MAM) monomer | 1.2 g |
| N-(2-Methacryloyloxyethyl)Ethylene Urea (50% in water) | 21.3 g |
| 2-Ethylhexyl acrylate (2-EHA) | 281.0 g |
| Vinyl neodecanoate | 460.1 g |
| DI water | 582.2 g |
| Sodium lauryl sulfate (30%) | 37.0 g |
| Sodium vinyl sulfonate (SVS) | 3.1 g |
| Sulfosuccinate surfactant (50%) | 10.0 g |
| Ammonium salt of phosphate ester surfactant (20%) | 30.5 g |
| Ammonium hydroxide (28%) | 1.2 g |

The latex has the following characteristic results as shown in the table below.

| Solids | Particle size | MFFT | Mechanic stability | pH | Mw |
|---|---|---|---|---|---|
| 44.8% | 75 nm | 5.6° C. | >30 min. | 8.2 | 103,000 |

Comparative Experiment C

The following table shows the results of block resistance for paint samples made from the latex of Examples 11-14 for comparison.

| ID | Example 11 | Example 12 | Example 13 | Example 14 |
|---|---|---|---|---|
| MAM:DAAM (weight ratio) | 1:1.33 | N/A | N/A | N/A |
| Block Resistance | 4 (pass) | 2 (fail) | 3 (fail) | 3 (fail) |
| Tinted color | Hamilton blue | Hamilton blue | Hamilton blue | Hamilton blue |

Example 15

To a similar reactor set up to Example 7 DI water (450.0 g), sodium $C_{14}$-$C_{16}$ olefin sulfonate (40% active, 1.5 g), and 1.0 g of NaHCO$_3$ were added and heated to 82.0° C. with N$_2$ sweep and agitation. The monomer emulsion was formed in a separate Erlenmeyer flask using the ingredients listed below.

| Monomer pre-emulsion composition | |
|---|---|
| Methyl methacrylate (MMA) monomer | 430.0 g |
| Butyl acrylate (BA) monomer | 435.0 g |
| Methacrylic acid (MAA) monomer | 9.0 g |
| Methacrylamide (MAM) monomer | 5.5 g |
| Diacetone acrylamide (DAAM) monomer | 8.3 g |
| N-(2-methacryloyloxyethyl) ethylene urea wet adhesion monomer (50%) | 19.2 g |
| Ammonium hydroxide (28%) | 1.0 g |
| Sodium $C_{14}$-$C_{16}$ olefin sulfonate (40%) | 5.8 g |
| Polyoxyethylene tridecyl ether phosphate, ammonium salt (25%) | 16.0 g |
| tristyrylphenol ethoxylate phosphate ester (20%) | 18.5 g |
| DI water | 360.0 g |

Into a separate container, HEC (0.9 g) was dissolved in DI water (40.0 g) which will be added later with the remaining 25% monomer emulsion during the feed.

Following surfactants were mixed with HEC solution before addition to the feed, which would prevent the coagulation/gelling.

| | |
|---|---|
| Polyoxyethylene tridecyl ether phosphate, ammonium salt (RHODAFAC ® RS 610/A25) (25%) | 10.6 g |
| POLYSTEP ® TSP-16 PE30 | 16.7 g |

An amount of monomer emulsion (60.0 g) and KPS (1.75 g) were charged to the reactor to form latex seed particles. The remaining monomer emulsion and KPS solution (90 ml, 1.1% by weight) were co-fed during a 3 hours period and then held for another hour. The t-BHP/FF6 pair (1.0 g t-BHP/0.85 g FF6) was used at the end of the reaction for residual monomer control, as well as the ammonium hydroxide to adjust the pH value to 8.2 and also other necessary preservatives such as Polycide 428 by example. The latex was filtered through a 140 mesh size screen filter and tested, and has the following parameters for reference:

| Solid | MAM:DAAM (weight ratio) | Particle size | MFFT | Film Gloss | pH |
|---|---|---|---|---|---|
| 46.6% | 1:1.51 | 141 nm | 10.6° C. | 72 (60°) | 8.2 |

Example 16

Using the same procedure and setup as disclosed in Example 15, 450.0 g of DI water, 1.5 g of sodium $C_{14}$-$C_{16}$ olefin sulfonate (40% active) and 1.0 g of NaHCO$_3$ were charged into the reactor and the mixture heated to 82.0° C.

The following monomer emulsion was delay fed into the reactor with KPS solution. When there was about 20% monomer emulsion remaining, 40.0 g of pre dissolved HEC solution was added to the monomer emulsion and the feed was continued until finished. After a one-hour hold, the batch was cool down to 65° C., redox pair, ammonium hydroxide, and other preservatives were added. Extra surfactant can also be added at this stage to improve the mechanical stability.

| Monomer pre-emulsion composition | |
|---|---|
| Methyl methacrylate (MMA) monomer | 430.0 g |
| Butyl acrylate (BA) monomer | 424.0 g |
| Methacrylic acid (MAA) monomer | 8.2 g |
| Methacrylamide (MAM) monomer | 2.8 g |
| Diacetone acrylamide (DAAM) monomer | 12.2 g |
| Styrene | 27.1 g |
| N-(2-methacryloyloxyethyl) ethylene urea Wet adhesion monomer (50% in water) | 18.2 g |
| Ammonium hydroxide (28%) | 2.0 g |
| Sodium $C_{14}$-$C_{16}$ olefin sulfonate (40%) | 5.8 g |
| Polyoxyethylene tridecyl ether phosphate, ammonium salt (25%) | 16.0 g |
| Ammonium salt of phosphate ester surfactant (20%) | 18.5 g |
| DI water | 360.0 g |

The following HEC solution was added with 20% remaining monomer emulsion and delay fed into the reactor.

| | |
|---|---|
| Hydroxyethyl cellulose (HEC) | 0.9 g |
| DI water | 39.1 g |
| Polyoxyethylene tridecyl ether phosphate, ammonium salt (25%) | 10.6 g |
| Ammonium salt of phosphate ester surfactant (20%) | 16.7 g |

| Solid | MAM:DAAM (weight ratio) | Particle size | MFFT | Mechanical stability | pH |
|---|---|---|---|---|---|
| 47.6% | 1:4.36 | 126 nm | 13° C. | Pass | 8.2 |

The mechanical stability is described in the earlier section and pass is rated when there is no gel formation after 30 minutes stirring at 12,000 RPM.

Paint examples A, B and C were made according to the following procedure and the paint samples are tested for their mechanical and physical properties.

Comparative Experiment D

Control Paint Example I

A standard paint was prepared as follows. Formulation of a control paint example I uses an all acrylic latex composition without crosslinking functionality. All weights are in grams.

| Grind: | |
|---|---|
| Propylene Glycol | 10.8 |
| Water | 104.5 |
| Biocide 1 | 1.5 |
| Antimicrobial 1 | 1.9 |
| Acrylic polymer dispersant 2 | 7.7 |
| Potassium carbonate | 1.7 |
| Titanium dioxide pigment | 232.1 |
| Extender Pigment 1 | 37.1 |
| Extender Pigment 2 | 25.5 |
| Extender Pigment 3 | 34.8 |
| Extender Pigment 4 | 8.5 |

| -continued | |
|---|---|
| Extender Pigment 5 | 8.5 |
| Defoamer 2 | 0.7 |
| Letdown: | |
| Phosphate Ester Surfactant, Ammonium Salt (25%) | 1.5 |
| Nonionic Surfactant 3 | 3.5 |
| Nonionic surfactant 4 | 0.8 |
| Anionic Surfactant 1 (60%) | 1.5 |
| Coalescent | 13.2 |
| All Acrylic Latex without Crosslinking Functionality | 321.1 |
| Polyurethane resin | 19.3 |
| Hydrophobically modified polyether rheology modifier | 18.6 |
| Hydrophobically modified polyethylene oxide urethane | 7.0 |
| Defoamer 2 | 2.3 |
| Defoamer 3 | 2.3 |
| Water | 33.1 |

The paint has a viscosity of 99 KU and 1.862 ICI.

Paint Example with Inventive Latex from Example 15

A paint composition using latex of Example 15 is prepared in the same manner as described for Control Paint Example I except that 351.4 g of Example 15 latex is used instead of 321.1 g of the control acrylic latex and 2.8 g of water is used in the letdown instead of 33.1 g of water. Also, 20 g of hydrophobically modified polyether rheology modifier is used instead of 18.6, and the amount of hydrophobically modified polyethylene oxide urethane is decreased by 0.5 g (to 6.5 g) to yield a paint composition with a viscosity of 95 KU and 1.717 ICI.

Paint Example (a) with Inventive Latex from Example 16

A paint composition using the latex of Example 16 was prepared in the same manner as described for control paint Example I except that 351.4 g Example 16 latex was used instead of 321.1 g control acrylic latex and 2.8 g water was used in the letdown instead of 33.1 g water. Also, 15 g of hydrophobically modified polyether rheology modifier was used instead of 18.6 g, and the hydrophobically modified polyethylene oxide urethane amount was decreased by 3.5 g (to 3.5 g) to yield a paint with a viscosity of 104 KU and 1.679 ICI.

The paint samples as described above were tested for their physical and mechanical properties and the results were entered into the table below.

| ID | MAM:DAAM (weight ratio) | Scrub (Cycles) | Water stain resistance | Water sensitivity (5 min.) | Block resistance (24 hrs at 120° F.) |
|---|---|---|---|---|---|
| Control Paint Example I | N/A | 1050 | 2 | 3 | 4 |
| Paint/Example 15 | 1:1.51 | 2100 | 2 | 3 | 4 |
| Paint/Example 16 | 1:4.36 | 2050 | 4 | 5 | 4 |

Comparative Experiment E

Control Paint Example II

A control eggshell paint was prepared with an all acrylic latex having DAAM composition with cross-linking functionality. A crosslinking agent, ADH is included in the formulation. All weights are in grams.

| Grind: | |
|---|---|
| DI Water | 153.1 |
| Biocide 1 | 2.3 |
| Biocide 2 | 2.8 |
| Acrylic Copolymer Dispersant 3 | 9.4 |
| Potassium Carbonate | 2.6 |
| Titanium dioxide pigment | 323.2 |
| Extender Pigment 6 | 22.7 |
| Extender Pigment 1 | 39.7 |
| Extender Pigment 2 | 56.7 |
| Extender Pigment 3 | 17.0 |
| Extender Pigment 4 | 13.6 |
| Extender Pigment 5 | 13.6 |
| Defoamer 2 | 1.1 |
| Letdown: | |
| Phosphate Ester Surfactant, Ammonium Salt (25%) | 2.3 |
| Nonionic Surfactant 3 | 2.3 |
| Nonionic Surfactant 4 | 1.1 |
| Anionic Surfactant 1 (60%) | 2.3 |
| Coalescent | 27.2 |
| ADH | 4.4 |
| All Acrylic Control Latex with DAAM | 453.6 |
| Styrene/acrylic copolymer | 28.3 |
| Hydrophobically modified polyether rheology modifier | 25 |
| Polysiloxane modified resin | 5.7 |
| hydrophobically modified polyethylene oxide urethane 2 | 3.5 |
| Defoamer 2 | 3.4 |

-continued

| | |
|---|---|
| Defoamer 3 | 3.4 |
| DI Water | 67 |

The paint has a viscosity of 95 KU and an ICI of 1.746.

Paint Example (b) with Inventive Latex from Example 16

A paint composition using the latex of Example 16 was prepared by following the paint formulation procedure of Control Paint Example II, except that (1) the Example 16 latex (486 g) was used instead of the all acrylic control latex with DAAM (453.6 g), (2) the ADH was left out of the formulation, (3) the amount of water used in the letdown was 34.6 g instead of 67 g, (4) the amount of hydrophobically modified polyether rheology modifier used was 10 g instead of 25 g, and (5) the amount of hydrophobically modified polyethylene oxide urethane used was 1 g instead of 3.5 g. The resulting paint composition had a viscosity of 102 KU and 1.017 ICI.

| ID | Crosslinkers | Scrub (cycles) | Water resistance (5 min.) |
|---|---|---|---|
| Control Paint Example II | ADH/DAAM | 2200 | 3 |
| Paint (b)/Example 16 | MAM/DAAM (1:4.36) | 2350 | 3 |

Example 17

To a 5-liter 4-necked round bottom glass reactor equipped with a mechanical stirrer, a thermocouple, a condenser, and nitrogen purge, 600 g of DI water, 2.1 g of sodium ($C_{14}$-$C_{16}$) olefin sulfonate, and 1.5 g of sodium bicarbonate were added and then heated to 82° C. The following surfactants and monomers were made into a pre-emulsion through agitation, 91.0 g of pre-emulsion and 2.6 g of KPS were charged to the reactor and heated for 20 minutes, and the rest of the pre-emulsion together with 91 ml of 1.0% KPS solution were delay fed in about three hours. After a one-hour hold at 84.0° C., the batch was cooled down to 65° C. and t-BHP/FF6 (Bruggolite® FF6, Disodium salts of 2-Hydroxy-2-sufinatoacetic acid and 2-Hydroxy-2-sufonatoacetic acid) chasers were added, and the pH of the latex was adjusted to about 8.0-8.5 using aqueous ammonia concentrate (28%). The latex sample was then ready for paint evaluations.

| Monomer pre-emulsion composition | |
|---|---|
| Methyl methacrylate (MMA) monomer | 675.5 g |
| Butyl acrylate (BA) monomer | 606.0 g |
| Methacrylic acid (MAA) monomer | 14.0 g |
| Methacrylamide (MAM) monomer | 4.2 g |
| Diacetone acrylamide (DAAM) monomer | 18.2 g |
| N-(2-methacryloyloxyethyl)ethylene urea Wet adhesion monomer (50%) | 30.6 g |
| Ammonia (28%) | 1.7 g |
| DI water | 540.0 g |
| Branched alcohol Ethoxy phosphate (25%) | 53.6 g |
| Sodium olefin sulfonate (40%) | 16.4 g |

Example 18

The latex was made by following a similar procedure as Example 17 using the following pre-emulsion compositions:

| Monomer pre-emulsion composition | |
|---|---|
| Methyl methacrylate (MMA) monomer | 676.5 g |
| Butyl acrylate (BA) monomer | 603.0 g |
| Methacrylic acid (MAA) monomer | 14.1 g |
| Methacrylamide (MAM) monomer | 5.1 g |
| Diacetone acrylamide (DAAM) monomer | 22.5 g |
| N-(2-methacryloyloxyethyl)ethylene urea Wet adhesion monomer (50%) | 30.6 g |
| Ammonia (28%) | 1.8 g |
| DI water | 540.0 g |
| Branched alcohol Ethoxy phosphate (25%) | 53.6 g |
| Sodium olefin sulfonate (40%) | 16.4 g |

| | Molecular weight increases for the same latex samples after the 7 day cure | | | | | |
|---|---|---|---|---|---|---|
| ID | MAM:DAAM (weight ratio) | Mw before cure | Mw after 7 days cure* | pH | Particle size | Solids |
| Example 17 | 1:4.33 | 161,000 | 178,000 | 8.5 | 130 nm | 49.2% |
| Example 18 | 1:4.41 | 159,200 | 180,300 | 8.3 | 132 nm | 49.2% |

*Mw for the after 7-day cure came from the soluble portion only.

The present inventors have further discovered that the aqueous paint composition with self-crosslinking latex polymers or resins comprising at least a pair of crosslinkable functional groups or moieties that are reactive with one another under ambient conditions in the absence of water or reduced water content to form a covalent bond, discussed above and in the parent and grand-parent applications, may also have a small amount of cross-linking agent present in the water phase. This small amount is less than the stoichiometric amount of this cross-linking agent necessary to cross-link with one of the crosslinkable functional moieties, such as DAAM, DANAM or AAEM, on the latex or resin. Due to the reactive nature of the cross-linking agent, such as ADH, and the adverse effects, such as increased water sensitivity and reduced cleansing ability of certain stains from the film, it is advantageous to keep the amount of crosslinking agent low, i.e., less than the stoichiometric amount to react with said crosslinkable moiety.

The present inventors conducted additional experiments to investigate the effects of a crosslinking agent, e.g., ADH, in the water phase on latex particles having two crosslinkable moieties, e.g., DAAM and MAM. The paint films, formed when these aqueous compositions are applied to a surface and dried, have improved scrub resistance according to ASTM-D2486 over films formed from similar aqueous compositions without a crosslinking agent such as ADH. Without being bound to any particular theory, it is believed that the small amount of ADH may improve the crosslinking between the crosslinkable moieties by cross-linking these crosslinkable moieties to each other. Or the small water soluble ADH molecules are easier to penetrate into the local sites, where the interactions between the crosslinkable moieties of MAM and DAAM were steric hindered, to improve the crosslinking density and hence improve the scrub resistance.

|                                              | Examples |       |       |       |
|----------------------------------------------|----------|-------|-------|-------|
| Monomers (grams)                             | 19       | 20    | 21    | 22    |
| MMA                                          | 567      | 603   | 585   | 583   |
| BA                                           | 546      | 514   | 505   | 530   |
| 2-EHA                                        | 26.5     | 32.6  | 28.7  | 33.9  |
| MAA                                          | 11.1     | 10.7  | 10.8  | 10.6  |
| AA                                           |          |       |       |       |
| Vinyl neodecanoate (VeoVa™ 10)               |          |       |       |       |
| Styrene                                      |          |       | 18.1  |       |
| N-(2-methacryloyloxyethyl) ethylene urea     | 23.5     | 23.4  | 23.4  |       |
| N-Methylol methacrylamide                    |          |       |       |       |
| DAAM                                         | 0        | 20.7  | 18.7  | 32.5  |
| MAM                                          | 0        | 4.5   | 4.2   | 8.0   |
| 1,4-butanediol diacrylate (i.e. SR-213)      |          |       |       |       |
| DAAM & MAM to total latex monomers           | 0        | 0.0208| 0.0192| 0.0338|
| DAAM/MAM ratio                               | —        | 4.6   | 4.45  | 4.06  |

These latex examples are used to prepare paints that have various amounts of ADH from 0% to about 2% by weight to determine the effects that ADH has on self crosslinkable latex particles with DAAM and MAM moieties. The results are summarized below.

| Comparative Experiment F: | | | | | | | |
|---|---|---|---|---|---|---|---|
| Paint Samples | DAAM | MAM | ADH | DAAM/ ADH | MAM/ ADH | Total‡/ ADH | Scrubs | Stain Rating |
| Example 19 | 0 | 0 | 0 | — | — | — | 849 | 5.1 |
| Example 20 | 1.75% | 0.40% | 0 | — | — | — | 1149 | n/a |
| Example 20 | 1.75% | 0.40% | 0.42% | 4.1 | 0.95 | 5.11 | 1383 | 8.1 |
| Example 20 | 1.75% | 0.40% | 0.85% | 2.1 | 0.47 | 2.53 | 169 3 | 9.6 |
| Example 21 | 1.75% | 0.40% | 0 | — | — | — | 1223 | 4.5 |
| Example 21 | 1.75% | 0.40% | 0.70% | 2.5 | 0.57 | 3.07 | 1560 | 5.2 |
| Example 22 | 2.60% | 0.70% | 0.62% | 4.2 | 1.13 | 5.32 | 1678 | 8.4 |
| Example 22 | 2.60% | 0.70% | 1.23% | 2.1 | 0.57 | 2.68 | 2060 | 11.0 |
| Conventional | 4.00% | 0 | 1.90% | 2.1 | 0 | 2.1 | 1359 | 10.0 |

*The percent concentrations of DAAM, MAM, and ADH are calculated based on the total latex binder solids in the paint formulations.
‡(DAAM + MAM)/ADH; all ratios are normalized, e.g., 4.1 means 4.1:1.

The stain test measures how easy or difficult for everyday stains, such as coffee or juices, to stick to the paint film. The stain test results shown in the above table can be interpreted with high values indicating poor results and low values indicating good results. The stain removal capability of the paint samples was rated according to a MPI cleansability test method disclosed by the Master Paint Institute Inc. (MPI) test code 147 with some modifications of test conditions. Instead of applying liquid stains to the drawdown film at a tilted angle of 60°, the liquid stains were applied to the film at horizontal position. This modification would make the liquid stains stay on the film surface longer, so that the test method would have a better sensitivity and could differentiate the samples better. The details of the test procedures can be found in the section 7.10 "Cleansability" of MPI test #147.

As Comparative Experiment F shows, there is a balance between good scrub resistance and stain rating when ADH or other crosslinking agent is added to the aqueous composition having latex particles with self-crosslinkable moieties. The results show that adding ADH improves the scrub resistance but lowers the stain rating. As discussed above, in conventional DAAM/ADH cross-linking system the ratio of DAAM/ADH is about 2.1, which is near their stoichiometric ratio. In paint samples with latex example 22, this same DAAM/ADH ratio produces high scrub resistance but also low stain rating. When the DAAM/ADH ratio is increased to about 4.2 with latex example 22, the scrub resistance remains high and the stain rating improves. The same is true for paints with latex samples 20. Also as shown by paint with latex sample 21, DAAM/ADH ratio of about 2.5 is also acceptable.

Hence, good scrub and stain rating results can be obtained in paint system with latex particles having at least two self-crosslinkable moieties, when the ratios of the combined the $C_4$-$C_{18}$ ethylenically unsaturated monomer moiety containing a ketone, such as DAAM, and the $C_3$-$C_{18}$ ethylenically unsaturated monomer moiety containing a primary amide, such as MAM, to the crosslinking agent in the aqueous phase such as ADM, as shown in Comparative Experiment E is preferably from about 2.5:1 to about 7.0:1, more preferably from about 2.7:1 to about 6.5:1 and more preferably from about 2.8:1 to about 6.0:1.

In one embodiment, a ratio between between the $C_4$-$C_{18}$ ethylenically unsaturated monomer moiety containing a ketone, such as DAAM, to the crosslinking agent in the aqueous phase, such as ADH, is preferably from about 2.3:1 to about 5.0:1, more preferably from about 2.5:1 to about 4.5:1 and more preferably from about 2.6:1 to about 4.4:1.

In another embodiment, a ratio of a $C_3$-$C_{18}$ ethylenically unsaturated monomer moiety containing a primary amide, such as MAM, to the crosslinking agent in the aqueous phase such as ADH, is preferably from about 0.3:1 to about 2.0:1, preferably from about 0.4:1 to 1.75:1 or more preferably from about 0.5:1 to about 1.5:1.

Detailed descriptions of Latex Examples 19-22 and of the paints discussed in Comparative Experiment F are discussed below.

Example 19

To a three-neck 5 L reactor equipped with a digital agitator and a temperature controller, 585 parts of DI water, 2.1 parts of sodium olefin sulfonate (40%), and 1.3 parts of NaHCO$_3$ were added. The reactor was heated to 73°-75.0° C. with N$_2$ sweep and agitation speed of 195-210 rpm.

To the reactor, 60 parts of monomer emulsion from the following composition, together with 1.9 g of potassium persulfate (KPS) was charged to form latex seeds. After latex seeds are formed, the rest of the monomer emulsion was fed into the reactor at about 8.0-10.0 ml/minute rate. The 90 ml of 1.5% initiator (KPS) solution was co-fed with monomer emulsion during 3 hours of feed.

| Monomer pre-emulsion compositions: | |
|---|---|
| MMA | 567.0 parts |
| BA | 546 parts |
| MAA | 11.1 parts |
| N-(2-methacryloxyethyl) ethylene urea 50% in water | 23.5 parts |
| 2EHA | 26.5 parts |
| Ammonium salt of branched alcohol phosphate ester (25%) | 20.8 parts |
| Sodium olefin sulfonate (40%) | 7.5 parts |
| Tristyrylphenolethoxyate phosphate ester (20%) | 24.1 parts |
| Ammonium Hydroxide (28%) | 3.0 parts |

Into a separate container with a magnet stirring bar, 1.3 part of HEC was dissolved in 52 part of DI water for later use. After 80%-90% of monomer emulsion was fed, the above pre-dissolved hydroxyethyl cellulose (HEC) in 52 parts of DI water, 21.7 part of tristyrylphenolethoxyate phosphate ester (20%), and 13.8 part of ammonium salt of branched alcohol phosphate ester (25%) were mixed into the remaining monomer emulsion. After the monomer emulsion with HEC was fed into the reactor, it was held at 78° C. for an additional hour or so and then cooled down.

The REDOX pair of t-BHP/SFS were added into the reactor when the batch was cooled down to about 65° C. to reduce residual monomers. The latex was neutralized with ammonium hydroxide to bring its pH value to about 8.5. A paint sample is made using this latex and the scrub resistance will be evaluated according to ASTM D-2486. This is the comparative control sample that contains neither DAAM nor MAM in its compositions. The latex sample has following properties:

| pH | Solids% | Particle size | MFFT | Mechanical Stability | Film gloss (60°) |
|---|---|---|---|---|---|
| 8.5 | 47.1% | 131 nm | 9.4° C. | Pass | 83 |

Example 20

To the similar reactor as described in example 19, 585 parts of DI water, 1.3 parts of sodium bicarbonate, and 2.1 parts of sodium olefin sulfonate were added and heated to about 73-75° C. The following surfactants and monomers, except for 10.7 parts of the DAAM which will be added later, were made into pre-emulsion through agitation. After the temperature is equilibrated, 60 parts of pre-emulsion and 2.0 parts of potassium persulfate (KPS) were then charged into the reactor and agitated at 195-210 rpm for about 20 minutes with $N_2$ sweep. The rest of the pre-emulsion together with 90 ml of 1.5% KPS solution was delay-fed into the reactor until about 60% left, and then the 10.7 parts of DAAM held earlier was added into the monomer emulsion to continue the feed. After 80% of monomer emulsion is fed, the pre-dissolved 52 parts of hydroxylethyl celluse (HEC) solution of 2.5%, as well as 13.8 parts of ammonium salt of branched alcohol phosphate ester (25%) and 21.7 parts of tristyrylphenolethoxyate phosphate ester (20%), were mixed with remaining monomer emulsions. The total delay-feed time is about 3 hours. After 1 hour hold at 78.0° C., the batch is cooled down to 65° C. and tBHP/SFA redox pair were added, and pH value of the latex was adjusted to about 8.5 using ammonium hydroxide concentrate. The latex sample is then made into paints for evaluations.

| Monomer pre-emulsion compositions | |
|---|---|
| MMA | 603 parts |
| BA | 514 parts |
| MAA | 10.7 parts |
| MAM | 4.5 parts |
| DAAM | 20.7 parts |
| N-(2-methacryloxyethyl) ethylene urea 50% in water | 23.4 parts |
| 2EHA | 32.6 parts |
| Ammonium hydroxide (28%) | 3.0 parts |
| DI water | 468 parts |
| Sodium olefin sulfonate (40%) | 7.5 parts |
| Tristyrylphenolethoxyate phosphate ester (20%) | 24.1 parts |
| Ammonium salt of branched alcohol phosphate ester (25%) | 20.8 parts |

The latex of above example has following properties:

| pH | Solids % | Particle size | MFFT | Mechanical stability | Film gloss (° 60) |
|---|---|---|---|---|---|
| 8.5 | 47.1 | 147 nm | 14.5 | Pass | 83 |

Example 21

This latex was made by following the similar procedures described in example 20. The only difference is that the 18.1 parts of styrene monomer and 10.0 parts of DAAM were added to about 60% remaining monomer emulsion to complete the feed. When there was about 20% of monomer emulsion remaining, then 52 parts of Hydroxyethyl cellulose solution of 2.5%, together with 13.8 parts of Ammonium salt of branched alcohol phosphate ester (25%) and 21.7 parts of tristyrylphenol ethoxyate phosphate ester (20%), were mixed with monomer emulsion and fed into the reactor the same way as described in example 20.

| Monomer pre-emulsion compositions | |
|---|---|
| MMA | 585 parts |
| BA | 505 parts |
| MAA | 10.8 parts |
| MAM | 4.2 parts |
| DAAM | 18.7 parts |
| N-(2-methacryloxyethyl) ethylene urea 50% in water | 23.4 parts |
| 2EHA | 28.7 parts |
| Styrene | 18.1 parts |
| Ammonium hydroxide (28%) | 3.0 parts |
| DI water | 468 parts |
| Ammonium salt of branched alcohol Ethoxy phosphate ester (25%) | 21.0 parts |
| Tristyrylphenol ethoxyate phosphate ester (20%) | 24.1 parts |
| Sodium olefin sulfonate (40%) | 7.5 parts |

The latex has following properties:

| pH | Solids % | Particle size | MFFT | Mechanical stability | Film gloss (° 60) |
|---|---|---|---|---|---|
| 8.7 | 47.5 | 146 nm | 17.2 | Pass | 84 |

Example 22

This latex was made by following the similar procedures disclosed in example 2. To the reactor, 585 parts of DI water, 1.3 parts of sodium bicarbonate, and 2.1 parts of sodium olefin ($C_{14}$-$C_{16}$) sulfonate (40%) were added. The compositions are listed below. Among 32.5 parts of DAAM, 10 parts was added later at about 80% remaining monomer emulsion. In this example, HEC is also grafted to the acrylic latex in similar amount as examples 19-21.

| | |
|---|---|
| MMA | 583 parts |
| BA | 530 parts |
| MAA | 10.6 parts |
| MAM | 8.0 parts |
| DAAM | 32.5 parts |
| N-(2-methacryloxyethyl) ethylene urea 50% in water | 23.4 parts |
| 2EHA | 33.9 parts |
| Ammonium hydroxide (28%) | 3.0 parts |
| DI water | 468 parts |
| Ammonium salt of branched alcohol Ethoxy phosphate ester (25%) | 21.0 parts |
| Tristyrylphenol ethoxyate phosphate ester (20%) | 24.1 parts |
| Sodium olefin ($C_{14}$-$C_{16}$) sultanate (40%) | 7.5 parts |

The latex sample has following properties:

| pH | Solids % | Particle size | MFFT | Mechanical stability | Film gloss (° 60) |
|---|---|---|---|---|---|
| 8.7 | 47.9% | 140 nm | 13.7° C | Pass | 82 |

Comparative Experiment F

The latex samples are then added to the paint formulations listed in the following table, and small amount of ADH was added into the each paint samples to evaluate the scrubs and other properties. Since the ADH would have some detrimental effects to the paint performance such as water sensitivity and cleansing ability for certain stains, the amount of ADH or other crosslinking agent(s) in the aqueous phase is minimized the final paint formulations while maintaining the performance benefits associated with ambient cross-linking.

| Paint Formulations | Parts | | Parts |
|---|---|---|---|
| Grind | | Letdown | |
| Water | 148.6 | Coalescent | 24.0 |
| Biocide 1 | 2.0 | Opaque acrylic copolymer | 25.0 |
| Biocide 2 | 2.5 | Rheology Modifier 1 | 24.0 |
| Acrylic polymer dispersant | 8.3 | Silicon additive | 5.0 |
| Potassium carbonate | 2.25 | Rheology Modifier 2 | 4.5 |
| TiO2 | 285.0 | Water | 56.24 |

-continued

| Paint Formulations | Parts | | Parts |
|---|---|---|---|
| Extender 1 | 20.0 | Defoamer 1 | 3.0 |
| Extender 2 | 35.0 | Defoamer 2 | 3.0 |
| Extender 3 | 50.0 | Water | 13.4 |
| Extender 4 | 15.0 | ADH (various amounts) | |
| Extender 5 | 12.0 | Acrylic polymer latex binders (51%) | 400.0 |
| Extender 6 | 12.0 | | |
| Defoamer 1 | 0.94 | | |
| Phosphate ester surfactant, ammonium salt (25%) | 2.0 | | |
| Nonionic surfactant | 2.0 | | |
| Hyperdispersant | 1.0 | | |
| Anionic surfactant 1 | 2.0 | | |

The latex samples of examples 19 through 22 were added to the above formulation separately as latex binders to make the paint samples for evaluations. The weight of the latex and water content in each paint sample were accordingly adjusted to maintain consistent active solids of latex binders among each sample. A control comparative latex sample with 4% DAAM and 1.9% ADM was also made for comparative purpose.

The grand-parent application PCT/US2012/055883 (U.S. Ser. No. 14,343,2920), which is incorporated herein by reference in its entirety, also discloses an aqueous latex composition comprising hydroxyethyl cellulose (HEC) grafted acrylic polymer emulsions, wherein the latex composition comprises at least about 0.2% of HEC by weight relative to the monomer weight, wherein latex composition contains at least about 45% solid, and wherein the average mean volume (mV) latex particle size is in the range of about 320- about 850 nm. The average mean volume (mV) particle size of the acrylic core is between about 150 nm and 280 nm. The latex composition contains less than about 700 ppm of gels.

The present inventors have further discovered that such HEC grafted acrylic latex can be made with at least 0.1% HEC by weight relative to the monomer weight and that the average mean volume (mV) latex particle size is in the range of about 130 nm to about 850 nm, while the gel content remains below 700 ppm. Properties of the aqueous composition remain substantially the same with the lower amount of HEC. In Examples 19-22, the latex examples also contain about 0.1% of hydroxyethyl cellulose (HEC) by weight relative to the monomer weight grafted onto the acrylic latex particles, and these latex examples exhibit substantially the same properties as those HEC grafted acrylic latexes disclosed in grand-parent application Ser. No. 14/343,292, while maintaining the gel content below 770 ppm.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. An aqueous composition comprising latex particles comprising a film forming monomer, a $C_4$-$C_{18}$ ethylenically unsaturated monomer moiety containing a ketone and a $C_3$-$C_{18}$ ethylenically unsaturated monomer moiety containing a primary amide, wherein the ketone is substantially unreactive to the primary amide when the latex particles are in water and wherein the ketone reacts with the primary amide and latex particles crosslink when water is at least partially removed from the latex under ambient conditions, wherein the aqueous composition further comprises a crosslinking agent in the aqueous phase, wherein said crosslinking agent is reactive with the monomer containing a ketone and wherein a ratio by weight of the monomer containing the ketone and the monomer containing the primary amide to the crosslinking agent is from about 2.5:1 to about 7.0:1.

2. The aqueous composition of claim 1, wherein the monomer containing a ketone is diacetone acrylamide, diacetone methacrylamide, or acetoacetoxyethyl methacrylate.

3. The aqueous composition of claim 1, wherein the monomer containing a primary amide is methacrylamide or acrylamide.

4. The aqueous composition of claim 1, wherein the crosslinking agent comprises adipic acid dihydrazide.

5. The aqueous composition of claim 1 wherein said ratio is from about 2.7:1 to about 6.5:1.

6. The aqueous composition of claim 1, wherein said ratio is from about 2.8:1 to about 6.0:1.

7. The aqueous composition of claim 4, wherein the film forming latex particles comprise acrylic latex particles.

8. The aqueous composition of claim 7, wherein the film forming latex particles comprises at least about 75% acrylic or vinyl monomers.

9. The aqueous composition of claim 4, wherein the monomer containing a ketone is diacetone acrylamide and the monomer containing a primary amide is methacrylamide and wherein the ratio by weight of diacetone acrylamide to methacrylamide ranges from about 20:1 to about 1:20 by weight.

10. The aqueous composition of claim 9, wherein the ratio by weight of diacetone acrylamide to methacrylamide ranges from about 8:1 to about 1:5.

11. The aqueous composition of claim 9, wherein the ratio by weight of diacetone acrylamide to methacrylamide ranges from about 6:1 to about 1:3.

12. The aqueous composition of claim 1, wherein the latex particles are polymerized from film forming monomers, wherein the monomer containing a ketone is diacetone acrylamide and the monomer containing a primary amide is methacrylamide and wherein a ratio by weight of diacetone acrylamide and methacrylamide to the film forming monomers ranges from about 0.1:100 to 10:100.

13. The aqueous composition of claim 12, wherein the ratio ranges from about 0.5:100 to 5:100.

14. The aqueous composition of claim 12, wherein the ratio ranges from about 1:100 to 3:100.

15. The aqueous composition of claim 4, wherein the latex particles have a molecular weight from about 20K to about 500K Daltons based on GPC measurement.

16. The aqueous composition of claim 4, wherein the latex particles have a molecular weight from about 80K to about 300K Daltons based on GPC measurement.

17. The aqueous composition of claim 4, wherein the latex particles have a MFFT from about −10° C. to about 50° C.

18. The aqueous composition of claim 4, wherein the latex particles have a MFFT from about −5° C. to about 25° C.

19. The aqueous composition of claim 1 wherein the latex particles comprise core shell latex particles having a shell polymer comprising diacetone acrylamide and methacrylamide moieties.

20. The aqueous composition of claim 19, further comprising a core polymer having a diacrylate crosslinker.

* * * * *